United States Patent
Vasylyev

(10) Patent No.: US 10,955,604 B2
(45) Date of Patent: *Mar. 23, 2021

(54) SUSPENDED LIGHTING FIXTURES EMPLOYING SHAPED LIGHT GUIDE ILLUMINATION DEVICES

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/276,602

(22) Filed: Feb. 14, 2019

(65) Prior Publication Data

US 2019/0179070 A1 Jun. 13, 2019

Related U.S. Application Data

(63) Continuation of application No. 15/793,755, filed on Oct. 25, 2017, now Pat. No. 10,267,972.

(60) Provisional application No. 62/412,596, filed on Oct. 25, 2016.

(51) Int. Cl.
| | |
|---|---|
| G02B 1/11 | (2015.01) |
| F21V 8/00 | (2006.01) |
| G09F 13/02 | (2006.01) |
| G09F 13/18 | (2006.01) |
| G09F 13/22 | (2006.01) |

(52) U.S. Cl.
CPC ........... *G02B 6/002* (2013.01); *G02B 6/0036* (2013.01); *G02B 6/0046* (2013.01); *G02B 6/0061* (2013.01); *G09F 13/02* (2013.01); *G09F 13/18* (2013.01); *G02B 6/0028* (2013.01); *G02B 6/0031* (2013.01); *G02B 6/0043* (2013.01); *G02B 6/0053* (2013.01); *G02B 6/0055* (2013.01); *G02B 6/0088* (2013.01); *G09F 2013/222* (2013.01)

(58) Field of Classification Search
CPC .... G02B 6/002; G02B 6/0036; G02B 6/0046; G02B 6/0061
USPC ......................................... 362/619, 606, 235
See application file for complete search history.

(56) References Cited

U.S. PATENT DOCUMENTS

| | | |
|---|---|---|
| 6,247,826 B1 | 6/2001 | Funamoto et al. |
| 6,332,690 B1 | 12/2001 | Murofushi |
| 6,540,382 B1 | 4/2003 | Simon |
| 6,749,313 B2 | 6/2004 | Ludwig et al. |
| 6,802,628 B2 | 10/2004 | Kuo |
| 7,188,989 B2 | 3/2007 | Miyashita |
| 7,565,054 B2 | 7/2009 | Rinko |

(Continued)

*Primary Examiner* — Karl D Frech

(57) ABSTRACT

A suspended lighting fixture for direct/indirect lighting having a broad light emitting surface and including a thin curved sheet of an optically transmissive material, an LED strip optically coupled to a light input edge of the curved sheet, one or more suspension elements, an elongated heat dissipating structural element longitudinally extending along the light input edge, and an opaque elongated housing at least partially enclosing the LED strip. The curved sheet may include forward-deflecting or forward-scattering elements distributed over an area of the curved sheet according to a two-dimensional pattern and configured to extract light from one location of the sheet and direct the extracted light toward a second location of the sheet.

26 Claims, 9 Drawing Sheets

(56) References Cited

U.S. PATENT DOCUMENTS

| | | |
|---|---|---|
| 7,972,042 B2 | 7/2011 | Lin et al. |
| 8,212,962 B2 | 7/2012 | Rocard et al. |
| 8,454,218 B2 | 6/2013 | Wang et al. |
| 10,267,972 B2 * | 4/2019 | Vasylyev ............... G02B 6/002 |
| 2003/0034985 A1 | 2/2003 | Needham Riddle et al. |
| 2004/0045199 A1 | 3/2004 | Ki |
| 2006/0050282 A1 | 3/2006 | de Lamberterie |
| 2009/0185389 A1 | 7/2009 | Tessnow et al. |
| 2010/0157577 A1 | 6/2010 | Montgomery et al. |
| 2010/0195346 A1 | 8/2010 | De Lamberterie |
| 2010/0238675 A1 | 9/2010 | Dubosc et al. |
| 2011/0051416 A1 | 3/2011 | Verbrugh et al. |
| 2012/0069579 A1 | 3/2012 | Koh et al. |
| 2013/0063925 A1 | 3/2013 | Boonekamp et al. |
| 2013/0121024 A1 | 5/2013 | Barth et al. |
| 2013/0336004 A1 | 12/2013 | Mulder et al. |
| 2013/0343084 A1 | 12/2013 | Okuda et al. |
| 2014/0212090 A1 | 7/2014 | Wilcox et al. |
| 2014/0369038 A1 | 10/2014 | Tischler et al. |
| 2015/0029747 A1 | 1/2015 | Hsieh et al. |
| 2015/0276189 A1 | 10/2015 | Palfreyman et al. |
| 2016/0270166 A1 * | 9/2016 | Xiong .................... H05B 45/37 |

* cited by examiner

SUSPENDED LIGHTING FIXTURES EMPLOYING SHAPED LIGHT GUIDE ILLUMINATION DEVICES

CROSS-REFERENCE TO RELATED APPLICATIONS

This application is a continuation of application Ser. No. 15/793,755, filed on Oct. 25, 2017, and claims priority from U.S. provisional application Ser. No. 62/412,596 filed on Oct. 25, 2016, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to illumination devices that employ light emitting diodes (LEDs) and sheet-form light guiding substrates. More particularly, this invention relates to broad-area edge-lit LED illumination panels. Embodiments described herein also relate to systems that incorporate such broad-area edge-lit LED illumination panels, such as for example, lighting fixtures or luminaires, backlights, illuminated signs or displays, traffic signs, automotive lights, and the like. Embodiments described herein further relate to methods for forming curved broad-area edge-lit LED illumination devices.

2. Description of Background Art

Conventionally, edge-lit illumination panels employ a planar light guide configured to transmit light in response to an optical transmission and a total internal reflection (TIR) and a light source optically coupled to an edge of the light guide. The light source is commonly represented by a linear fluorescent lamp or a strip of interconnected LEDs. The light guide typically includes light extracting elements distributed over the surface of the light guide which suppress TIR and cause the light guide to emit light from its broad-area surface. The conventional edge-lit illumination systems may exhibit certain limitations such as difficulty to control angular distribution.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

According to one embodiment, a shaped illumination device is exemplified by a flexible sheet of an optically transmissive material and a LED source optically coupled to an edge of the flexible sheet. The flexible sheet has at least one curvature about an axis and defines a concave broad-area surface, an opposing convex broad-area surface extending parallel to said concave broad-area surface, a first edge, and an opposing second edge. The flexible sheet further includes a plurality of light extraction elements formed in or on a broad-area surface of the flexible sheet. According to different implementations, the light extraction elements may be formed in the concave surface of the flexible sheet, in the convex surface of the flexible sheet or in both opposing surfaces of the flexible sheet. The light extraction elements may be formed by discrete surface relief features distributed over an area of the flexible sheet according to a predefined two-dimensional pattern and configured for forward-deflecting or forward-scattering operation such that light extracted at one location of the flexible sheet can be received and re-emitted at another location of the flexible sheet.

According to one embodiment, a method of making a curved edge-lit illumination device, consistent with the present invention, includes providing a plurality of LEDs, a flexible sheet of an optically transmissive material, and a sheet of a reflective material. The method further includes steps of forming light extracting features in the flexible sheet, bending the flexible sheet and the sheet of a reflective material to a curved shape, positioning the sheet of a reflective material adjacent to a convex surface of the flexible sheet, optical coupling the plurality of LEDs to an edge of the flexible sheet; and partially enclosing the plurality of LEDs into an opaque housing.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
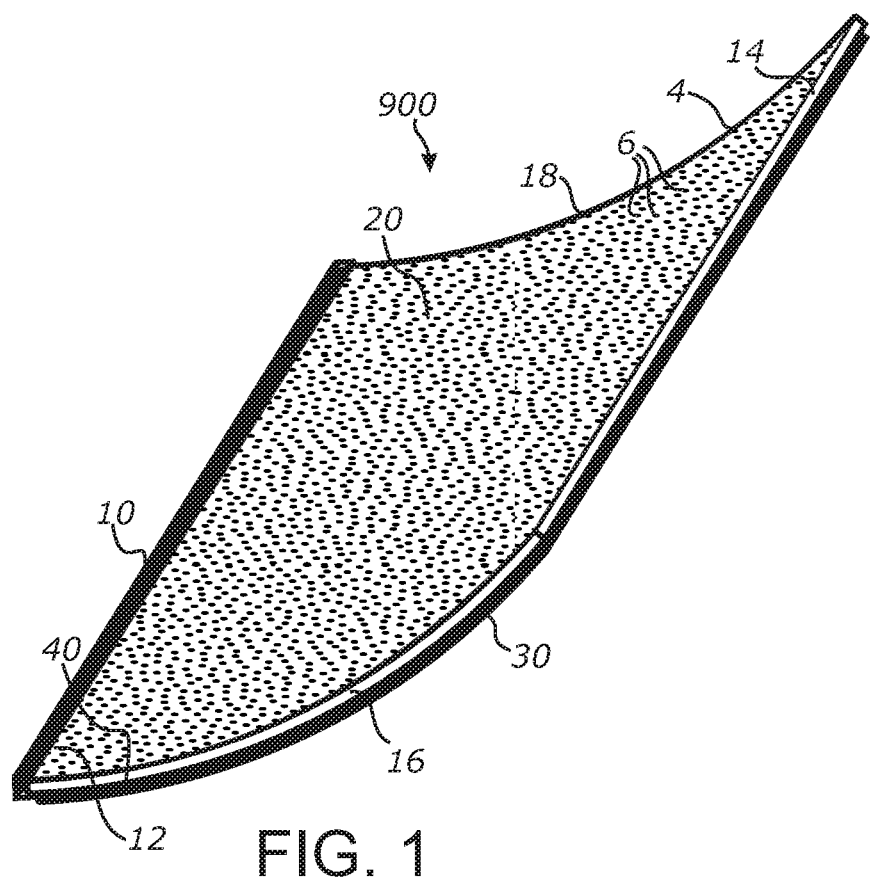
FIG. 1 is a schematic perspective view of a shaped light guide illumination device, according to at least one embodiment of the present invention.

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exists for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

It is also noted that terms such as "top", "bottom", "side", "front" and "back" and similar directional terms are used herein with reference to the orientation of the Figures being described and should not be regarded as limiting this invention in any way. It should be understood that different elements of embodiments of the present invention can be positioned in a number of different orientations without departing from the scope of the present invention.

Various embodiments of the invention are directed to shaped light guide illumination devices and systems that employ an edge-lit light guiding sheet which is curved about at least one axis. For example, such curved light guiding sheet may be formed into the shape of a partial cylindrical trough with an arc-shaped transversal cross-section. The trough may have a transversal cross-sectional profile that can be approximated by a portion of a conical section (e.g., a circle, an ellipse, a parabola, or a hyperbola). The trough may have a constant of variable radius of curvature across its surface and may further have planar sections.

The light guide may me formed by a rigid sheet or slab of an optically transmissive, dielectric material, such as glass, PMMA or polycarbonate, for example. The light guide may also be formed by a relative thin sheet of the transmissive material that is flexible. The term "flexible", as applied to sheet-form structures (including flexible sheet-form substrates and/or layers), is generally directed to mean that such structures are capable of being noticeably flexed or bent with relative ease without breaking. It is noted that, while flexible sheet-form structures are in contrast to the ones that are rigid or unbending, the material of a sheet-form structure does not need to be soft or pliable in order to make such sheet-form structure flexible. Accordingly, the term "flexible" is directed to also include semi-rigid structures and structures that are formed by relatively hard, rigid materials such as metals, glass or rigid plastics, when such structures have sufficiently low thickness compared to at least one their major dimension (e.g., length or width) and allow for noticeable flexing without breaking.

The present invention will now be described by way of example with reference to the accompanying drawings.

FIG. 1 schematically shows an embodiment of a shaped edge-lit light guide illumination device 900 having a rectangular sheet-form configuration and at least one curvature about an axis. Shaped illumination device 900 includes a curved light guide 4, an elongated, linear light source 10, a concave back reflector 30, and a plurality of light extraction elements 6 distributed over a wide area of light guide 4.

Light guide 4 is formed by a flexible rectangular sheet of highly transmissive material. The flexible sheet is bent to a curved shape so it defines a concave broad-area surface 20 and an opposing convex broad-area surface 40 extending parallel to surface 20. The flexible sheet further defines four edges 12, 14, 16, and 18 connecting the opposing broad-area surfaces and flanking the solid, transparent body of the light guide. Concave broad-area surface 20 is configured for light output and may further be configured for light input. Opposing convex broad-area surface 40 extends parallel to surface 20 and is configured for both light input and output.

Edge 12 is configured for light input. Light guide 4 is configured to guide light from light input edge 12 to opposing edge 14 in response to optical transmission and reflection from opposing broad-area surfaces 20 and 40 by means of TIR. Light guide 4 is gently curved about an axis that is parallel to light input edge 12 and perpendicular to a direction of the intended light propagation in the light guide. Similarly, reflector 30 may be formed from a flexible sheet-form material and curved to the same shape as light guide 4.

The curved shape of light guide 4 may be characterized by a radius of curvature $R_C$ in the respective plane of the bend. On the other hand, it may also be characterized by a length L of a curved segment representing such curved shape in a transversal cross-section in a plane that is perpendicular to light input edge 12.

Radius of curvature $R_C$ may be constant across the area of light guide 4 and may be measured at any point of surfaces 20 or 40. It may also be made variable across the light guide's area and may be measured at the respective locations of surfaces 20 or 40. $R_C$ is preferably greater than 5 times the thickness of the light guide, more preferably greater than 10 times, and even more preferably greater than 20 times the thickness of light guide 4 at each point of surfaces 20 and 40. On the other hand, at least a portion of light guide 4 has radius of curvature $R_C$ that is less than a certain maximum value. According to some embodiments, such maximum value may be defined by length L. According to one embodiment, radius $R_C$ is less than 3 times length L. According to one embodiment, radius $R_C$ is less than 2 times length L. According to one embodiment, radius $R_C$ is less than 1.5 times length L. According to one embodiment, radius $R_C$ is less than 1.3 times length L. According to one embodiment, radius $R_C$ is less than length L.

Reflector 30 is formed by an opaque sheet of a flexible and highly reflective material. Reflector 30 is positioned adjacent to convex surface 40 of light guide 4 so that its concave reflective surface is facing the light guide and generally conforms to the curved shape of the light guide. According to one embodiment, reflector 30 may be of a specular type. For example, it may include a mirrored surface reflecting light by means of specular reflection. According to one embodiment, reflector 30 may be of a diffuse type. For example, it may include a diffuse high-reflectance coating, such as white paint or white-powder coating containing titanium dioxide. According to one embodiment, reflector 30 may be configured to reflect in both specular and diffuse regimes. For example, reflector 30 may have a mirrored surface which includes surface corrugations, waviness or microstructure that causes the reflected rays to spread over a limited angular range. For instance, reflector 30 may be configured to reflect an incident parallel beam of light into a cone of reflected light having a fixed angular spread (e.g., 10°, 20°, 30°, and so on).

The desired light-diffusing power of reflector 30 may also be defined based on a Full Width Half Maximum (FWHM) angle characterizing such diffusely reflected beam. According to one embodiment, the surface of reflector 30 is configured to reflect light at FWHM angle that is less than 60°. According to one embodiment, the FWHM angle is less than 30°. According to one embodiment, the FWHM angle is less than 20°. According to one embodiment, the FWHM angle is less than 10°.

The desired reflective characteristics of reflector 30 may also be defined based on proportions between secularly and diffusely reflected light. According to various embodiments, a ratio between the light energy reflected in a specular regime to the light energy reflected in a diffuse regime is any one of the following: 0.2, 0.4, 0.5, 0.6, 0.7, and 0.8.

While surface 40 is ordinarily transparent, it may also be mirrored or made diffusely reflective as an alternative to employing reflector 30. Reflective surface 40 may be formed by depositing a layer or reflective material or film on top of it. The entire area of surface 40 or only its selected areas may be made reflective. A reflective layer formed on surface 40 may be provided with any of the properties described above for reflector 30.

Linear light source 10 is positioned in a close proximity to light input edge 12 so that at least a 50% or more light emitted by the source can be input into light guide 4 through such light input edge. Linear light source 10 may be exemplified by a fluorescent tube or a strip of LEDs extending parallel to light input edge 12. The LEDs may be incorporated in a linear, two-dimensional array which may include one, three or more rows and a number of columns. The LEDs may also be distributed over the surface of light input edge 12 according to a randomized two-dimensional pattern.

Light extraction elements 6 may be formed, for example, by dots of white paint or ink printed on either one or both surfaces 20 and 40. Light extraction elements 6 may also be formed by interruptions or protrusions in otherwise smooth broad-area surfaces of light guide 4. Light extraction elements 6 may be formed by light-deflecting surface relief features including but not limited to grooves, cavities, microprisms, microlenses, holes, protrusions, or roughened portions of the light guide surface. Such surface relief features may be formed in either one or both of surfaces 20 and 40.

Light extraction elements 6 may also be formed by light deflecting particles distributed throughout the volume of the body of light guide 4. By way of example, such light deflecting particles may include sub-micron size light-scattering particles embedded into the material of light guide 4. In a further example, such light deflecting particles may be formed by macroscopic inclusions of a dielectric material having a different refractive index than the material of light guide 4.

According to further embodiments, light extraction elements 6 may be formed by forward-scattering particles or relatively shallow surface relief structures configured to incrementally deflect light rays from the original propagation path by relatively small angles upon each interaction. Examples particularly include shallow surface corrugations and volumetrically distributed forward-scattering particles. Such light deflecting structures and elements are disclosed in U.S. Patent Applications Publication No. 2014/0140091, the disclosure of which is incorporated herein by reference in its entirety.

In the context of at least a preferred embodiment of the present invention, the term "forward scattering" is directed to mean the scattering of light involving a change of direction of less than 90 degrees. When applied to the propagation of a light ray through a forward-scattering medium, the light ray can be considered forward scattered when it is randomly deflected by the medium from the original propagation path towards a direction that makes an angle with the original propagation direction of less than 90 degrees. Similarly, the term "forward deflection" with respect to a light ray is directed to mean the deflection of such light ray at an angle of less than 90 degrees with respect to the original propagation path.

It is noted that, according to at least some embodiments, the forward-scattering operation of forward-scattering medium does not preclude backscattering (scattering in a generally backward direction) in which a portion of the incident light is scattered at angles of 90 degrees or more with respect to the incidence direction. Furthermore, according to at least some embodiments, it may be desired that backscattering accompanies the forward scattering. The proportions between the forward scattered and backscattered light energy may vary in a broad range. According to one embodiment, more than 50% of the incident light can be forward scattered and less than 50% of the incident light can be backscattered. According to one embodiment, more than 50% of the incident light can be backscattered and less than 50% of the incident light can be forward scattered. According to one embodiment, no less than 20% of the incident light energy is forward scattered and no less than 20% of the incident light energy is backscattered. According to one embodiment, no less than 30% of the incident light energy is forward scattered and no less than 30% of the incident light energy is backscattered. According to one embodiment, no less than 40% of the incident light energy is forward scattered and no less than 40% of the incident light energy is backscattered. According to one embodiment, the proportions between the forward scattered and backscattered portions of the light energy (after the subtraction of the absorbed light, if any) can be either one of 60%/40%, 70%/30%, 80%/20%, 20%/80%, 30%/70%, and 40%/60%. Furthermore, according to at least one embodiment, the forward-scattering angle can be much less than 90 degrees, for example, 60 degrees, 45 degrees, or 30 degrees. According to one embodiment, the forward-scattering angle is one of the following ranges: less than 60 degrees, less than 45 degrees and less than 30 degrees.

Figure 2:
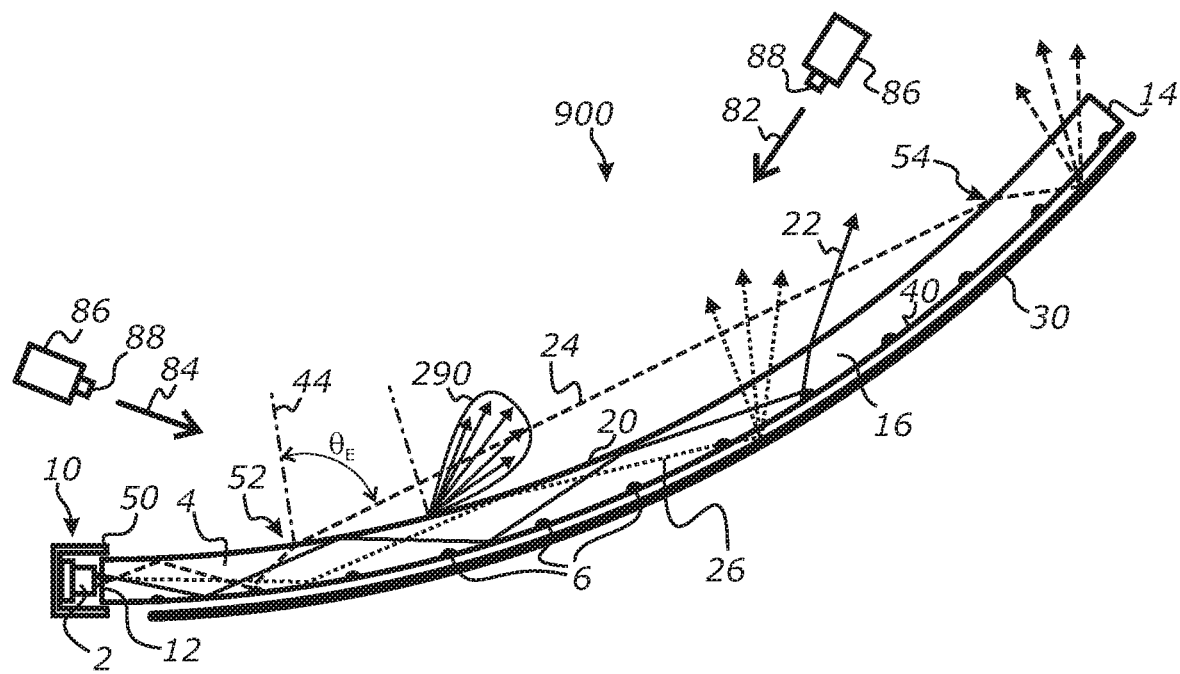
FIG. 2 is a schematic section view and raytracing of a shaped light guide illumination device, according to at least one embodiment of the present invention.

FIG. 2 schematically illustrates shaped illumination device 900 in a cross-section that is perpendicular to light input edge and parallel to a plane of a prevailing curvature of the device. Illumination device 900 of FIG. 2 has the shape of an arc of a circle in such cross-section. It has a constant radius of curvature $R_C$ being less than 1.2 times a width of the sheet that forms light guide 4 (as measured in the illustrated cross-section).

Linear light source 10 is exemplified by an LED 2 enclosed into an extruded structural channel 50. It should be understood that light source 10 may include any suitable number of LEDs 2 distributed along the length of light input edge 12 (and channel 50) according to any suitable pattern. Each LED 2 may be of an inorganic type and may include one or more LED chips or dies incorporated into an LED package. Such LED chips or dies may be arranged in one-dimensional or two-dimensional array within the LED package and may be encapsulated by a layer of optically transmissive encapsulation material. The encapsulation material may include phosphors for wavelength conversion of light emitted by the LED chips or dies.

The light input portion of light guide 4 that encompasses light input edge 12 and adjacent areas of surfaces 20 and 40 may further include light-coupling optics that enhances light injection into light input edge 12. Yet further, a layer of a transparent, index-matched dielectric material (such as silicone or UV-curable acrylic, for example) may be provided between LED 2 and light input edge 12 to fill the air gap and enhance light coupling from the LED to the light guide. Various examples of LEDs and light coupling optical elements suitable for enhanced light input into sheet-form light guides are disclosed in a co-pending U.S. Patent Applications Publication No. 20170045666, the disclosure of which is incorporated herein by reference in its entirety, and U.S. Patent Applications Publication No. 20140226361, the disclosure of which is incorporated herein by reference in its entirety. When such light coupling optics is used, a light emitting aperture of LED 2 may have a size that is greater than a thickness of sheet-form light guide 4 at light input edge 12. Otherwise, it is preferred that the light emitting aperture of LED 2 is approximately equal to or less than the light guide thickness at light input edge 12.

Light input edge 12 may be specially shaped to facilitate light coupling into light guide 4. Edge 12 may include cavities, protrusions, extensions and thicker or thinner areas or portions. Light input edge 12 may also include a tapered portion. Opposing edge 14 may also be configured for light input and shaped or configured according to the same principles described above for light input edge 12.

Light may also be input into light guide 4 through either one or both broad-area surfaces 20 and 40. Examples of such light input through broad-area surfaces (faces) of planar waveguides are disclosed in detail in U.S. Patent Applications Publications Nos. 20170045666 and 20140226361. In various implementations of shaped illumination device 900, LEDs 2 may also be embedded into the body of light guide 4.

Channel 50 is configured to provide structural support for light source 10 and may at least partially enclose the light source. Referring to the embodiment of FIG. 2, extruded channel 50 may be designed to hold LED 2 in a prescribed place and orientation with respect to light input edge 12. It is preferred that channel 50 is made from a material that has high thermal conductivity and structural strength. Conventionally, channel 50 can be made from aluminum extrusion and configured to provide enhanced heat dissipation from LED 2. Channel 50 may optionally include heat dissipating fins (not shown) extending parallel or perpendicular to a longitudinal axis of the channel and configured to remove heat from LED 2. Each LED 2 may be attached/bonded to channel 50 with a good mechanical and thermal contact.

According to one embodiment, at least some light extraction elements 6 are configured to extract light from light guide 4 and cause light emission from at least concave broad-area light input/output surface 20. Furthermore, it is preferred that at least a substantial portion of light exits from surface 20 at relatively high emergence and is directed generally towards edge 14 of light guide 4. According to one embodiment, at least some light extraction elements 6 are configured to extract light from light guide 4 and cause light emission from at least convex broad-area light input/output surface 40. According to one embodiment, at least one of light extraction elements 6 is configured to extract light from light guide 4 through both surfaces 20 and 40.

A cone of light 290 schematically illustrates a directional light beam emitted from a particular area of surface 20. Such light beam may have a sharply asymmetric angular distribution such that most of the extracted light rays form a relatively low angle with respect to their original propagation direction in light guide 4 and a relatively high angle with respect to a surface normal. For example, at a given light emitting location of surface 20, an angle between a prevailing direction of light propagation and a normal to surface 20 may be greater than 30°, greater than 45°, greater than 60°, and greater than 70°. The prevailing propagation direction of the emergent light beam should also generally be pointing away from light input edge 12. The emission angles and the size and curvature of light guide 4 are preferably selected such that at least one different area of concave surface 20 is positioned in energy receiving relationship with respect to the extracted/emitted light and is configured to intercept at least a portion of such extracted/emitted light. For example, as illustrated in FIG. 2, an area of surface 20 adjacent to edge 14 may be positioned in energy receiving relationship with respect to a light emitting area of surface 20 that is located in a proximity to light input edge 12.

It is noted that cone of light 290 is shown for illustrative purposes only. It is also shown to indicate a sharply asymmetric angular distribution of the beam emitted from concave surface 20. However, it is further noted that the operation of shaped illumination device 900 does not preclude emitting light from surface 20 at angles outside of such cone of light 290. It should be understood that portions of light energy may be emitted from surface 20 at any angle within the full ±90° angular range (with respect to a normal to surface 20 at the corresponding emission point). More particularly, a significant fraction of light can be emitted toward a normal direction with respect to surface 20. According to one embodiment, a substantial fraction of light may also be emitted generally towards a source direction.

A luminance of surface 20 at any given location and at a particular emission angle may be measured using a luminance meter, such as, for example, LS-100/110 or LS-150/160 spot luminance meters commercially available from Konica Minolta, Inc. The angular asymmetry of the light beam emitted from a particular area of light-emitting surface 20 may be assessed by measuring surface luminance at different angles with respect to a surface normal. The angular luminance distribution of the entire light-emitting surface 20 may be measured using a goniophotometer such as those used for evaluating lighting fixtures.

Let's define an on-axis luminance $E_{on-axis}$ of light-emitting surface 20 at a given point of the surface as a luminance measured within an angular range from 0° and 45° with respect to a surface normal at such point. Let's further define an off-axis luminance $E_{off-axis}$ of light-emitting surface 20 at the same point as a luminance measured within an angular range between 45° and 90° with respect to the surface normal. According to different embodiments, it is preferred that a maximum off-axis luminance $E_{off-axis}$ at a mid-point of surface 20 is greater than a maximum on-axis luminance $E_{on-axis}$ at least by a factor of 1.2, 1.3, 1.4, and 1.5. It may further be preferred that off-axis luminance $E_{off-axis}$ measured from a direction 82 (e.g., using a luminance meter 86 which light receiving aperture 88 is generally facing light input edge 12) is substantially greater (e.g., by a factor of 1.5, 2, 3, or more) than off-axis luminance $E_{off-axis}$ measured from a direction 84 (e.g., with light receiving aperture 88 of luminance meter 86 generally facing away from light input edge 12).

It may be appreciated that the embodiments of shaped illumination device 900 employing reflector 30 of a diffuse type may exhibit a reduced asymmetry of the emitted light beam compared to the cases where reflector 30 is of a specular type or where the device is used without any reflector. This is primarily due to the fact that diffuse reflector 30 introduces random light propagation directions to the total light beam emitted by the device and may therefore partially or completely mask the asymmetric angular distribution produced by light guide 4 alone. Yet, it is noted that, according to at least some embodiments, Illumination device 900 may be configured to emit light with a measurable asymmetrical angular distribution of the emitted beam even in the presence of diffuse reflector 30.

Different modes of operation of shaped illumination device 900 are further illustrated by example of light rays 22, 24, and 26 emanated by LED 2 and schematically depicted by solid, dashed and dotted lines, respectively.

Ray 22 (solid line) enters light guide 4 via light input edge 12 and propagates in the body of the light guide towards opposing edge 14 in response to optical transmission and TIR until it encounters one of the plurality of light extraction elements 6. The respective light extraction element 6 deflects ray 22 away from a surface plane and out of light guide 4. According to one embodiment, it is preferred that light extraction element 6 deflects ray 22 by means of a forward deflection or forward scattering. As a result, ray 22 exits from light guide 4 through concave light-output surface 20. The emergence angle is such that ray 22 propagates generally away from light input edge 12 and towards opposing edge 14, forming a relatively low propagation angle (significantly less than 90°) with respect to surface 20.

Ray 24 (dashed line) is likewise emitted by LED 2 and coupled to light guide 4 through its light input edge 12. Ray 24 initially propagates in a waveguide mode until it strikes one of the forward-deflecting or forward-scattering light extraction elements 6 relatively near light input edge 12. Ray 24 is deflected away from its original propagation path and emitted from surface 20 at a location 52. Upon the exit from light guide 4, ray 24 forms a relatively high emergence angle $\theta_E$ with respect to a surface normal 44 and further travels through air along surface 20 and towards opposing edge 14 of waveguide 4. The area of illumination device 900 near edge 14 is curved appropriately and configured to intercept such light rays propagating at near-grazing angles with respect to surface 20. As a result, ray 24 that travels a considerable distance outside of light guide 4 enters the light guide for the second time at a location 54. Upon the re-entry, ray 24 propagates transversely through light guide 4, undergoing double refraction at surfaces 20 and 40, exits from surface 40 and strikes reflector 30 beneath light guide 4. Reflector 30 reflects ray 24 with some forward scattering and causes at least a substantial portion of light energy of ray 24 to be emitted from surface 20 in the form of a divergent light beam, as schematically illustrated in FIG. 2. Such divergent light beam further propagates away from surface 20 and contributes to the total light beam produced by illumination device 900.

Accordingly, ray 24 initially emerging from light guide 4 relatively close to light input edge 12 (at location 52) and at a relatively high emergence angle $\theta_E$ is trapped by illumination device 900, recycled and re-emitted from a different area of the light guide (at location 54). The final propagation direction of ray 24 may be different from its initial propagation direction. Such difference may constitute, for example 45°, 60°, or 90°. The final propagation directions and the emission cone may be controlled by the slope of reflector 30 and its reflective properties (e.g., a diffusion angle). It may be appreciated that such controlled recycling of light rays may be advantageously used to spatially and angularly redistribute the light beam and provide various prescribed emission patterns. For instance, shaped illumination device 900 may be configured to emit a relatively narrow (collimated) light beam with relatively uniform light intensity.

According to an aspect, illumination device distributes light emitted by LED 2 by means of light propagation though light guide 4 and also by means of propagation of a portion of light outside light guide 4 through the volume formed by the curved shape of flexible sheet that forms the light guide.

According to different embodiments, shaped illumination device 900 is configured for asymmetric light outcoupling from light guide 4 such that at least a substantial portion of light emerging from the light guide has exit angles (emergence angles) below 40°, below 30°, below 20°, or below 10°. Furthermore, reintroducing light initially emitted at a first location of light guide 4 (e.g., near light input edge 12) at a different second location (e.g., near opposing edge 14), as illustrated by ray 24, may be advantageously used to increase the luminance of device 900 at the second location. For example, portions of shaped illumination device 900 near edge 14 may otherwise receive insufficient amount of light due to the depletion of light energy in light guide 4 as the light travels from light input edge 12 to the opposing edge 14. This may particularly be the case in embodiments of shaped illumination device 900 in which light extraction elements 6 are identical and also spaced identically across the area of light guide 4. In such embodiments, light extraction elements 6 may progressively extract fewer and fewer light from light guide 4 as the distance for light input edge 12 increases. Without light recycling, a light emitting area of shaped illumination device 900 near opposing edge 14 may appear considerably darker than a similar area near light input edge 12 or at a mid-section of the device. Thus, recapturing and re-emitting some of the high-emergence-angle by the areas of device 900 near edge 14 may at least partially compensate such light depletion and enhance the brightness uniformity across the light emitting surface of the device.

Ray 26 (dotted line) initially propagates within light guide 4 in a waveguide mode in response to optical transmission and bouncing from surfaces 20 and 40 by means of TIR until it strikes one of light extraction elements 6. Unlike rays 22 and 24, ray 26 is deflected towards convex surface 40 of light guide 4, as a result of forward-deflecting or forward-scattering operation of the respective light extraction element 6. Accordingly, ray 26 emerges from light guide 4 towards reflector 30. Reflector 30 reflects ray 26 with some scattering and causes at least a substantial portion of the light energy of ray 26 to be emitted from surface 20 away from illumination device 900 in the form of a diffuse light beam. The diffusion angle may be controlled by the reflective properties of the surface of reflector 30 and/or the forward-scattering properties of light deflecting element 6. According to one embodiment, shaped illumination device 900 is configured to emit light from the entire exposed surface 20 into prescribed directions such that the apparent brightness of the surface is relatively uniform when viewed from at least one of those directions.

Since surfaces 20 and 40 are curved, light propagating in light guide 4 may receive additional angular bias compared to the case of a planar light guide having the same dimensions and structure. It may be appreciated that at least some of the outermost out-of-plane light rays initially propagating in light guide by TIR may eventually escape from curved light guide 4 even without encountering light extraction elements 6. It may further be appreciated that such escaping light rays may emerge at near-grazing angles with respect to the light emitting surface. Since both surfaces 20 and 40 are transparent and permeable to light propagating at below-TIR angles, light may escape at near-grazing angles from either one or both sides of light guide 4. According to one embodiment, the curvature of light guide 4 may be selected so that the emergence angles of the escaping light rays are generally above 60° with respect to a surface normal (or below 30° with respect to the light-emitting surface) at the respective escape location. According to one embodiment, the curvature of light guide 4 may be selected so that light primarily emerges at angles generally above 70° with respect to a surface normal (or below 20° with respect to the light-emitting surface). Light rays emerging form light guide 4 at such angles may be recycled, angularly redistributed and re-emitted from shaped illumination device 900 at according to the mechanisms described above by example of rays 22, 24 and 26.

According to one embodiment, shaped illumination device 900 may be implemented without curved reflector 30 in which case light exiting from surface 40 will leave the device and can be used for two-sides emission (e.g., light can be emitted from both opposing surfaces 20 and 40). According to one embodiment, reflector 30 may be provided on the side of concave broad-area surface 20 in which case nearly all of the light emitted by device 900 can be emanated from convex broad-area surface 40. According to some embodiments, shaped illumination device 900 may be implemented without light extraction elements 6 and the light trapped in light guide 4 may be extracted by other means, for example, by appropriately curving and/or tapering the light guide along its length from light input edge 12 to opposing edge 14.

It may be appreciated that edge-lit systems typically require a variable density or variable sizing of light extraction features to provide a relatively uniform light output from the light-emitting surface of a light guide. At one-sided light input, the density or sizes of light extracting features typically increase from a light input edge towards the opposing edge. In contrast, light recycling described above allows more light to be emitted from a portion of light guide 4 opposing to light input edge 12 than it would have otherwise been possible with a planar light guide of the same dimensions and internal structure. In view of this, according to one embodiment, shaped illumination device 900 may include light extraction elements 6 that are identical and have a generally uniform distribution density over the light emitting area of light guide 4 (e.g., constant spacing and sizes). By using the light recycling principles described above, such illumination device may be configured to provide a relatively uniform apparent brightness of its light-emitting surface at least at some viewing angles. According to an alternative embodiment, shaped illumination device 900 may include light extraction elements 6 distributed over the area of light guide 4 according to a varying pattern but such pattern may be different from the one which would be required for a planar configuration of light guide 4 to provide the same level of luminance uniformity. For example, the density of light extraction elements 6 may increase from light input edge 12 to opposing edge 14. In a further example, the size or light extraction elements 6 may increase from light input edge 12 to opposing edge 14 while the density may be kept constant.

According to one embodiment, at least some of the light propagated in light guide 4 may also be emitted from edge 14 towards directions that are different from the original propagation direction of light emitted by LED 2. An angle between the original propagation direction and the prevailing direction of light emergence from edge 14 may be approximately equal to an effective bend angle of light guide 4.

Figure 3:
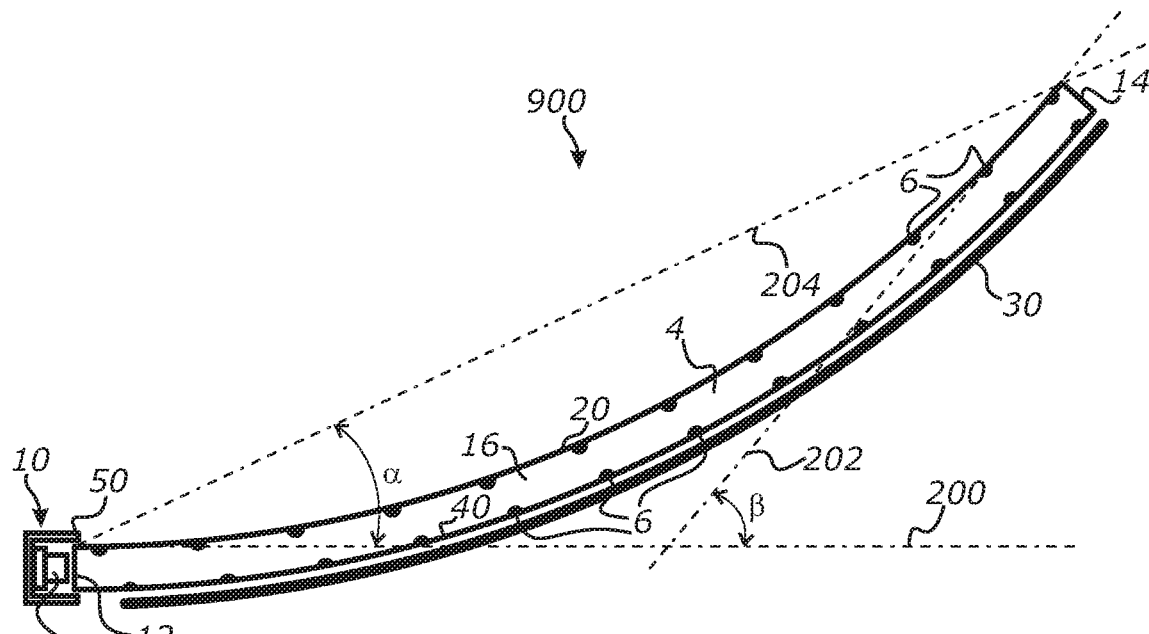
FIG. 3 is a schematic section view of a shaped light guide illumination device, illustrating a bend angle and an emission cutoff angle, according to at least one embodiment of the present invention.

FIG. 3 schematically shows, in a transversal cross-section that is perpendicular to surfaces 20 and 40 and light input edge 12, an embodiment of shaped illumination device 900 which is identical to that of FIG. 2 except that light extraction elements 6 are also formed in surface 20. A reference line 200 is parallel to an optical axis of LED 2 and perpendicular to light input edge 12. The optical axis of LED 2 may be defined as an axis that crosses the center of a light emitting aperture of LED 2 and is perpendicular to such light emitting aperture. Alternatively, the optical axis may also be defined as an axis that crosses the center of a light emitting aperture of LED 2 and is parallel to a direction of the maximum intensity of light emitted by LED 2. In the illustrated case, reference line 200 is perpendicular to the planar surface of light input edge 12 and parallel to portions of surfaces 20 and 40 adjacent to light input edge 12. Reference line 200 also indicates a tangent plane to surface 20 near light input edge 12. Referring further to FIG. 3, a reference line 202 indicates a tangent plane to surface 20 at opposing edge 14.

Let's define a bend angle $\beta$ of shaped illumination device 900 as an angle between the tangent planes at light input edge 12 and opposing edge 14. According to one embodiment, bend angle $\beta$ is equal to or greater than 20°. According to one embodiment, bend angle $\beta$ is greater than 20° and less than 90°. According to one embodiment, bend angle $\beta$ is greater than 30° and less than 90°. According to one embodiment, bend angle $\beta$ is greater than 45° and less than 90°. According to one embodiment, bend angle $\beta$ is about 90°. According to one embodiment, bend angle $\beta$ is greater than 90° and less than 180°.

In view of the discussion presented in reference to FIG. 2, it may be appreciated that a beam of light emitted by shaped illumination device 900 may be advantageously limited to generally exclude light propagation along directions that make relatively small angles with respect to reference line 200. A critical cutoff angle $\alpha$ of light emission may be defined as an angle between reference line 200 and a reference line 204 that connects opposing edges 12 and 14 of light guide 4. According to one embodiment, less than 10% of the total light energy emitted by shaped illumination device 900 propagates at angles below angular cutoff angle $\alpha$. According to one embodiment, less than 5% of the total light energy emitted by shaped illumination device 900 propagates at angles below angular cutoff angle $\alpha$. Shaped illumination device 900 may also be configured such that virtually no light is emitted below such angular cutoff. Accordingly, substantially all of the light emission may be directed to a relatively narrow, prescribed angular range. Such arrangements may basically preclude a direct view of the light input edge at viewing angles below cutoff angle $\alpha$. They may also be advantageously employed for designing lighting luminaires that emit at least partially collimated light and provide masking of the light source (such as high-brightness LEDs) to prevent or minimize glare that may be caused by such light source. According to different embodiments, shaped illumination device 900 is configured to provide cutoff angle $\alpha$ of at least 10°, at least 20°, at least 30°, at least 40°, and at least 45°. According to different embodiments, the total emission angle of shaped illumination device 900 may be less than 140°, less than 120°, less than 90°, less than 60° and less than 45°. A FWHM emission angle of shaped illumination device 900 may be less than 100°, less than 90°, less than 45°, and less than 35°.

While LED 2 is shown being coupled to light input edge 12 by positioning a light emitting aperture of the LED in a close proximity to the light input edge, other forms of LED 2 coupling to light guide 4 may be used. For example, light can be coupled to light guide 4 partially or entirely through one or both of its surfaces 20 and 40, or through a combination of light input edge 12 and surfaces 20 and/or 40. Furthermore, according to one embodiment, a refractive index matching layer of an optically transmissive material may be provided between LED 2 and light input edge 12 of light guide 4 to eliminate the respective air gap and suppress Fresnel reflections within the material of LED 2. Examples of such different forms of light coupling into light guide 4 may be found, for example, in U.S. Patent Application Publications Ser. No. 20170045666 and 20140226361, the disclosures of which are incorporated herein by reference by their entirety.

Figure 4:
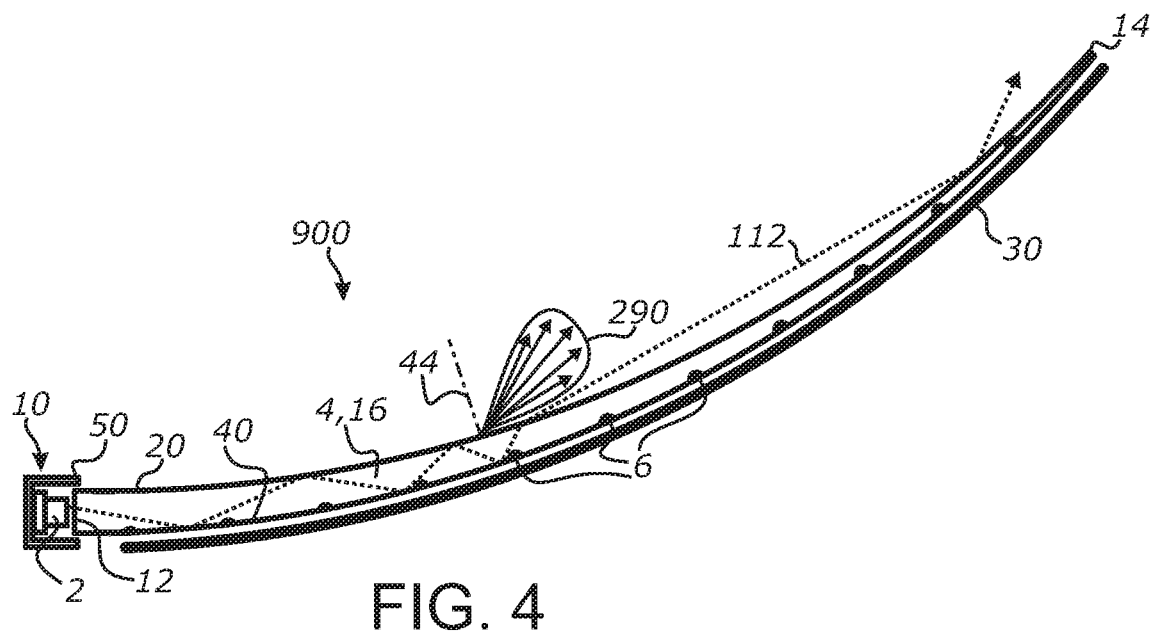
FIG. 4 is a schematic section view and raytracing of a shaped light guide illumination device, showing a curved and tapered light guide, according to at least one embodiment of the present invention.

FIG. 4 schematically depicts an embodiment of shaped illumination device 900 in which curved light guide 4 has a tapered configuration. Such light guide 4 has a larger thickness at light input edge 12 and a substantially smaller thickness at opposing edge 14. Broad-area surfaces 20 and 40 gradually converge towards each other at edge 14 so that the body of light guide 4 has the form of a thin, curved wedge.

In operation, a light ray 112 coupled to light guide 4 through its wider light input edge 12 is propagated towards opposing narrower edge 14 undergoing multiple TIRs from surfaces 20 and 40. Since surfaces 20 and 40 are not exactly parallel to each other and are further curved, a propagation angle of ray 112 with respect to such surfaces progressively increases with each bounce until it becomes less than a critical angle of TIR characterizing the material of light guide 4.

At this point, ray 112 exits from light guide 4, undergoing refraction at surface 20, and further propagates along surface 20 at near-grazing angle. Subsequently, ray 112 strikes a curved portion of light guide 4 at another location (e.g., near opposing edge 14) where at least a substantial portion of its energy is reflected by means of a Fresnel reflection, contributing to the total collimated light beam emitted by device 900.

It is noted that such secondary Fresnel reflection from surface 20 is illustrated by way of non-limiting example only and as one of the possible scenarios of light propagation. For example, depending on the emergence angle and the geometry of shaped illumination device 900, ray 112 may also undergo refraction at the secondary interaction with surface 20 and can be recycled and re-emitted, similarly to ray 24 of FIG. 2. Furthermore, when an emergence angle of ray 112 is sufficiently low (with respect to a surface normal), it may completely avoid the secondary interaction with surface 20 and may thus continue its propagation along the original emission direction. Considering various possible scenarios of light propagation, it may be appreciated that the light guide 4 having a tapered configuration may be configured to emit a highly asymmetric light beam with relatively high emergence angles, as illustrated by cone of light 290.

While the embodiment of shaped illumination device 900 may be configured to redistribute and emit light from its entire surface even without light extraction elements 6, such light extraction elements may still be provided to enhance the light extraction rate and/or enhance the uniformity of light emission. In other words, the wedge-shaped configuration of light guide 4, its curved shape and the plurality of light extraction elements 6 may act cooperatively to extract light from light guide 4 and contribute to the total emission flux of device 900.

Figure 5:
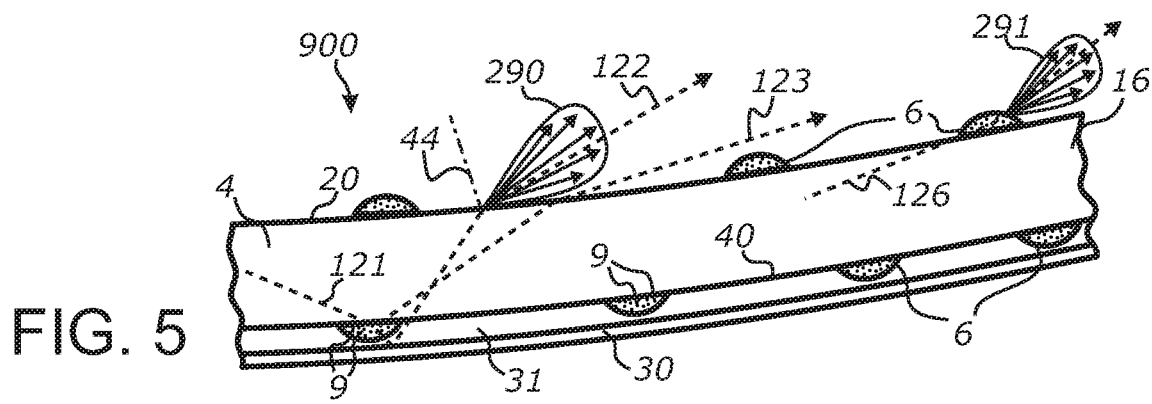
FIG. 5 is a schematic section view and raytracing of a shaped light guide illumination device portion, showing forward-scattering surface relief features formed in convex and concave surfaces, according to at least one embodiment of the present invention.

FIG. 5 schematically illustrates an embodiment of illumination device 900 in which light extraction elements 6 are exemplified by forward-scattering surface relief features that are formed in both surfaces 20 and 40 and represent discrete bulges of light scattering material protruding from the respective surfaces. According to one embodiment, each of these bulges may have a rounded hemispherical shape in a cross-section.

Figure 6:
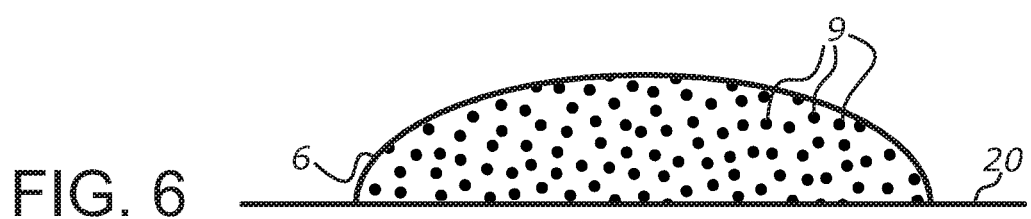
FIG. 6 is a schematic close-up section view of an individual forward-scattering light extraction element formed on a surface of a light guide and having a curved profile of a top surface, according to at least one embodiment of the present invention.
Figure 7:
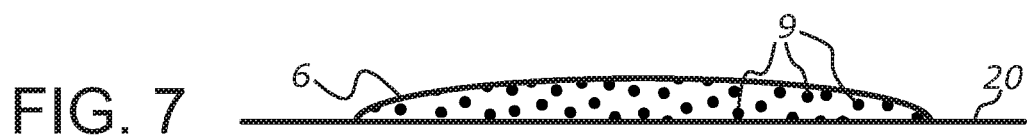
FIG. 7 is a schematic close-up section view of an individual forward-scattering light extraction element having a lower thickness compared to FIG. 6, according to at least one embodiment of the present invention.
Figure 8:
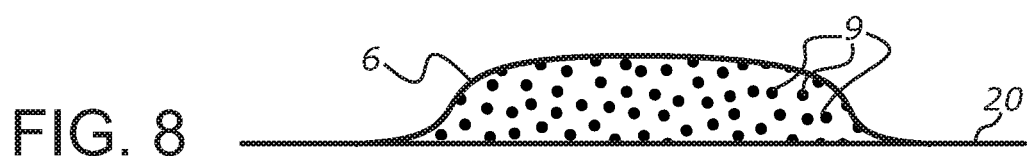
FIG. 8 is a schematic close-up section view of an individual forward-scattering light extraction element having a rounded "hat"-type shape, according to at least one embodiment of the present invention.
Figure 9:
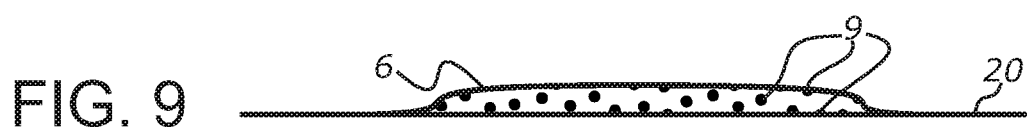
FIG. 9 is a schematic close-up section view of an individual forward-scattering light extraction element having a lower thickness compared to FIG. 8, according to at least one embodiment of the present invention.
Figure 10:
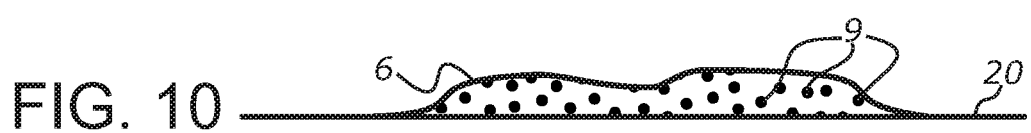
FIG. 10 is a schematic close-up section view of an individual forward-scattering light extraction element having an irregular profile of a top surface, according to at least one embodiment of the present invention.

Several examples of different shapes of the bulges are illustrated in FIG. 6 through FIG. 10. The top surface of the bulge may be curved so that the bulge has a variable thickness gradually decreasing from its center to the periphery (FIG. 6 and FIG. 7). According to one embodiment, each of the bulges may have a rounded "hat"-type shape in a cross-section (FIG. 8). According to one embodiment, each of the bulges may have a relatively low thickness and flat or nearly flat top surface that extends about parallel to the respective surface (FIG. 9). According to one embodiment, the top surface of each bulge may be irregular (FIG. 10) or microstructured and the respective irregularities or microstructures may be configured to enhance scattering of the extracted light.

According to one embodiment, an average thickness of each bulge is between 2 micrometers and 15 micrometers. For example, an individual bulge may have a thickness of 6 micrometers, 8 micrometers, 10 micrometers or 15 micrometers at a highest point and a reduced thickness of only 2, 3, 4 or 5 micrometers at peripheral areas. The outermost peripheral areas of the bulges may have thicknesses that are below 1 micrometer (e.g., 0.1 or 0.5 micrometers).

According to one embodiment, the thickness of the light-extracting surface relief features and the load of forward-scattering particles are selected such that each light extraction element 6 is semi-opaque. According to one embodiment, each light extraction element 6 is configured to partially transmit light, with some forward scattering, and partially reflect light back toward the source, with some backscattering, when illuminated.

The forward-scattering and backscattering properties of the material forming semi-opaque, back-scattering light extraction element 6 may be evaluated, for example, by measuring a bidirectional scattering distribution function (BSDF) for a uniform layer of the same material deposited to a surface of a glass or acrylic plate. Such plate or film should preferably be made from the same or similar material as light guide 4 and may also have a similar thickness. The coating should preferably have a uniform thickness approximating the average thickness of the bulges forming forward-scattering light extraction elements 6. For such measurements, the coated plate or film can be illuminated by a collimated light source from a perpendicular direction. As a practical consideration, the BSDF function may also be customarily obtained by separately measuring BRDF (bidirectional reflectance distribution function) and BTDF (bidirectional transmittance distribution function). A ratio between the forward-scattered and backscattered light can be estimated by dividing the total transmitted light energy by the total reflected light energy. In a variation of the technique, the measurements may be adapted to employ illuminating the sample from a direction that makes an angle of about 45 degrees with respect to a surface normal.

According to one embodiment, the material of semi-opaque, forward-scattering light extraction elements 6 may be selected such that an energy ratio between the forward-scattered (diffusely transmitted) light and the backscattered (diffusely reflected) light measured according to the above-described technique falls into one of the following ranges: 0.2 to 0.3, 0.3 to 0.4, 0.4 to 0.5, 0.5 to 0.6, 0.6 to 0.7, and 0.7 to 0.8. According to one embodiment, no less than 20% of the incident light energy is forward scattered and no less than 20% of the incident light energy is backscattered. According to one embodiment, no less than 30% of the incident light energy is forward scattered and no less than 30% of the incident light energy is backscattered. According to one embodiment, no less than 40% of the incident light energy is forward scattered and no less than 40% of the incident light energy is backscattered. The specific ratios between the forward-scattered and backscattered light exemplified above can be achieved, for example, by properly selecting the sizes and volumetric load of the light scattering particles in a clear binder or resin that is used to produce the forward-scattering material of light extraction elements 6.

According to one embodiment, the volume of each bulge may be between 10000 cubic micrometers and 100000 cubic micrometers. According to one embodiment, the volume of each bulge may be between 10000 cubic micrometers and 500000 cubic micrometers. According to one embodiment, the sizes and volumes of the bulges may vary across surfaces 20 and/or 40 from 1000 cubic micrometers to 500000 cubic micrometers. For example, some individual bulges may have volumes of around 10000 cubic micrometers or less and some individual bulges may have volumes of around 30000 cubic micrometers, 40000 cubic micrometers, 60000 cubic micrometers, 100000 cubic micrometers or more.

According to one embodiment, the size (e.g., a diameter of the contact area of the bulge with surface 20 or 40) of individual bulges can be within one of the following ranges: 20 to 200 micrometers, 10 to 20 micrometers, 20 to 60 micrometers, 60 to 100 micrometers, 100 to 200 micrometers, and 200 to 500 micrometers. The sizes may also vary from one bulge to another. For example, a first group of bulges may have sizes between 10 and 50 micrometers and a second group of bulges may have sizes between 100 and 150 micrometers. The bulges of different sizes, volumes, thicknesses and shapes may be mixed to cover an individual area of light guide 4, according to a randomized pattern, where bulges of one size can be alternated with bulges of another size or sizes. The shapes may be regular (e.g., round, elliptical, square/rectangular, rectangular with rounded corners) or irregular (e.g., dumb-bell shaped, comma-shapes, having complex geometries or multiple curvatures of the respective outline).

Forward-scattering light extraction elements 6 that are formed in or on surface 20 may be distributed over the area of light guide 4 according to a first two-dimensional pattern and forward-scattering light extraction elements 6 that are formed in surface 40 may be distributed over the area of light guide 4 according to a second two-dimensional pattern which may be the same or different from the first pattern. Either one or both patterns may be ordered or random and may have constant or variable distribution densities over the respective surfaces. For example, the density may increase with the distance from LED 2.

Each of forward-scattering surface relief features that form light extraction elements 6 is disposed with a good optical contact with the surfaces on which it is formed and includes forward-scattering particles 9 distributed throughout its volume. According to one embodiment, the forward-scattering particles include non-light-absorbing white pigment which may include, for example, nanoparticles of titanium dioxide having sizes from 200 to 400 nanometers and configured to deflect light by means of a diffraction and optionally by a refraction. According to an aspect, forward-scattering light extraction elements 6 formed in surface 40 and the light-scattering particles 9 that they contain represent an area-distributed forward-scattering layer disposed between surface 40 and reflector 30 and optically coupled to light guide 4.

The respective surface relief features may be formed by depositing small drops of white ink or paint on surface 40 in a liquid form with the subsequent curing, e.g., by UV light. Such ink or paint may include a uniform suspension of forward-scattering particles 9 in a clear resin or binder. Individual drops of the white ink or paint may be deposited to surface 40 by means of piezo-actuated ink jet printing and cured by a UV LED lamp, for example. A hollow spacing layer 31 between surface 40 and reflector 30 should be sufficient to accommodate the height of surface-protruding light extraction elements 6.

In operation, referring to FIG. 5, a light ray 121 emanated by LED source 12 (not shown) and propagating in light guide 4 in response to TIR and optical transmission strikes one of forward-scattering light extraction elements 6 where it is split into two or more rays. A portion of ray 121 is deflected by forward-scattering particles 9 towards reflector 30, as indicated by a light ray 122. Ray 122 is subsequently reflected from reflector 30 and exits from light guide 4 through surface 20.

A light ray 123 illustrates a portion of light ray 121 that is reflected by the material of light extraction element 6 directly toward surface 20, similarly with some forward scattering. Both rays 122 and 123 are emitted at relatively high angles with respect to normal 44. Accordingly, considering multiple light rays propagating in light guide 4 at different angles with respect to surfaces 20 and 40, each relatively small portion of surface 20 may be configured to emit light in a forward direction (away from LED 2) and within a narrow angular range, as illustrated by cone of light 290.

A light ray 126 illustrates light that is extracted from light guide 4 by individual light extraction element 6 that is formed on surface 20. Ray 126 enters the respective surface relief feature (e.g., a bulge formed by a cured drop of a light scattering while-pigmented ink) and is forward scattered away from the extraction location and out of light guide 4. Similarly, multiple rays propagating in light guide 4 and striking the respective light extraction element 6 can be forward scattered, forming a cone of light 291.

Figure 11:
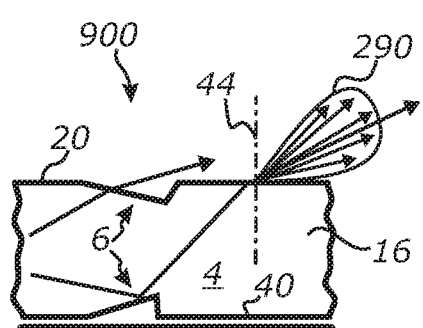
FIG. 11 is a schematic section view and raytracing of a light guide portion, showing forward-deflecting light extraction elements configured to provide an asymmetric angular distribution of emitted light, according to at least one embodiment of the present invention.
Figure 12:
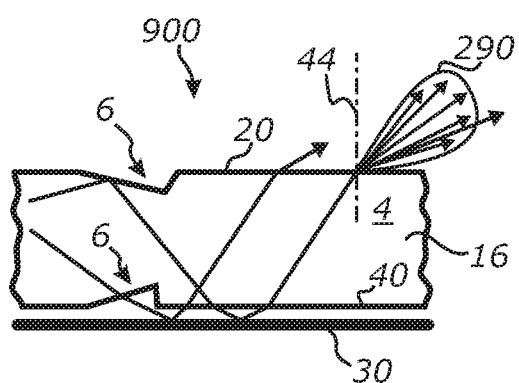
FIG. 12 is a schematic section view and raytracing of a light guide portion, showing forward-deflecting light extraction elements configured to provide an asymmetric angular distribution of emitted light in a different mode of operation, according to at least one embodiment of the present invention.

FIG. 11 schematically illustrates light extraction elements 6 exemplified by shallow (having low-angle reflective/refractive facets) prismatic surface relief features that provide forward-deflecting function with respect to light rays propagating in light guide 4. More specifically, the prismatic surface relief features are represented by micro-prismatic grooves formed in surfaces 20 and 40. The micro-prismatic grooves have a triangular cross-section and sloped surfaces configured to extract light from light guide 4 using refraction and/or TIR and to provide relatively high emergence angles of light rays, as illustrated by emission cone 290. FIG. 12 illustrates a different mode of light extraction using such prismatic surface relief features and reflector 30, also resulting in a low-angle off-axis emission.

Figure 13:
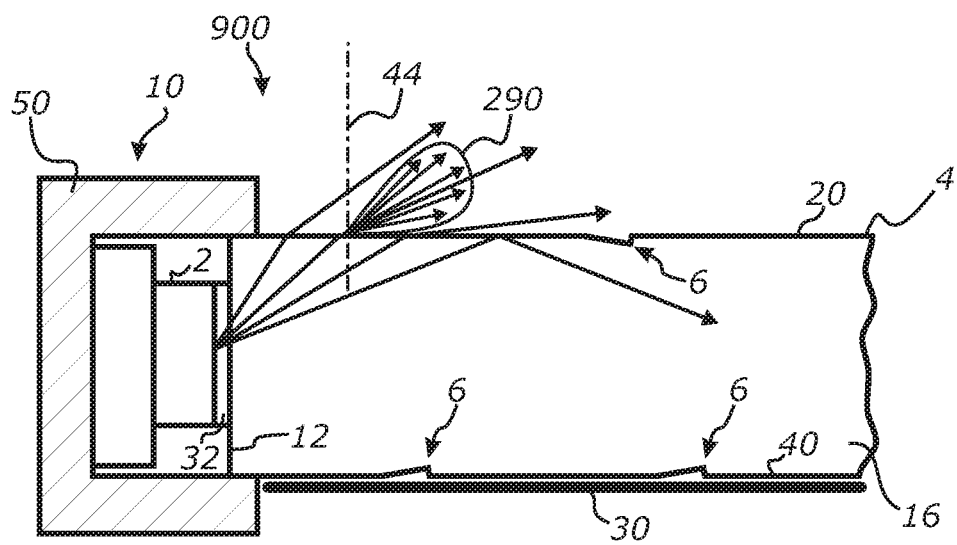
FIG. 13 is a schematic section view and raytracing of a light input portion of a shaped light guide illumination device, showing a layer of an index matched material disposed between a light emitting aperture of a light emitting diode and a light input edge of a light guide, according to at least one embodiment of the present invention.

FIG. 13 schematically illustrates an embodiment of shaped illumination device 900 having enhanced optical coupling between LED 2 and light guide 4. It also schematically illustrates a yet further mode of light extraction from light guide 4 at high emergence angles. A layer 32 of index-matched optical material is provided between LED 2 and light input edge 12 such that the material completely fills the air gap between the light emitting surface of LED 2 and the light-receiving surface of light input edge 12. The material of layer 32 should have a refractive index substantially greater than that of air ($n_{air} \approx 1$). A preferable range of the refractive index is 1.4-1.8. According to one embodiment, layer 32 may have a refractive index approximating that of light guide 4. According to one embodiment, layer 32 may have a refractive index approximating that of an encapsulation layer that may be employed in LED 2.

In operation, light rays emitted by LED 2 at low off-axis angles are trapped within light guide 4 and propagate in a waveguide mode. Light rays emitted by LED 2 at relatively high off-axis angles may exit from surface 20 in a vicinity of light input edge 12 and form relatively high emergence angles. Accordingly, some of the emergent rays, at least those having the highest emergence angles (with respect to a surface normal), may be intercepted by other portions of shaped illumination device 900 and recycled and re-emitted from such other portions at different emergence angles, according to the principles discussed above.

It may be appreciated that the refractive index matching may be also be advantageously used to enhance the efficiency of light extraction from LED 2 by providing a gapless light transfer from the respective LED chips to light guide 4 for light rays that could otherwise be trapped and lost within the LED package. Thus, the illustrated configuration of shaped illumination device 900 may allow emitting more light from the respective LEDs compared to the bare LED packages that are not coupled to light guide 4 using the refractive index matching.

Figure 14:
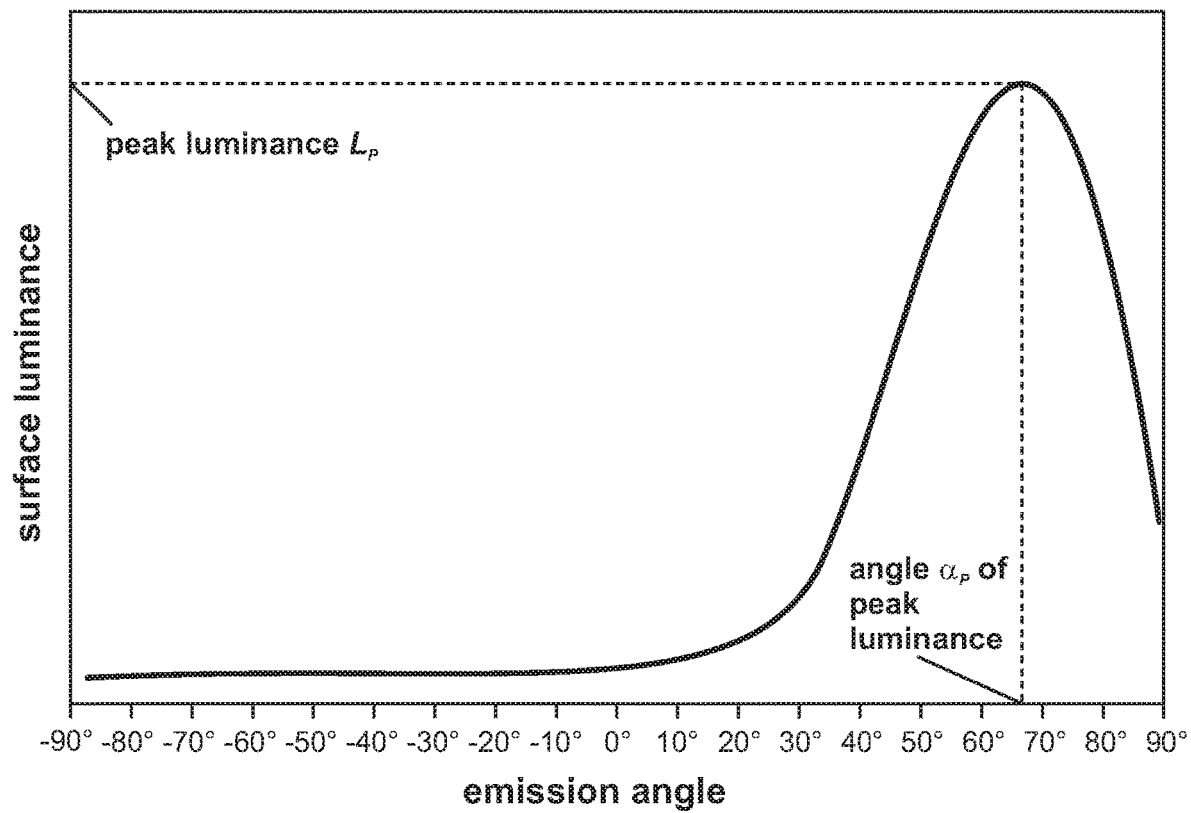
FIG. 14 is a schematic graph illustrating an angular distribution of a surface luminance of a light guide.

FIG. 14 depicts a schematic exemplary dependence of surface luminance of light guide 4 from the emission angle in a plane parallel to a prevailing direction of light propagation in light guide 4. The emission angle is measured with respect to a surface normal. The negative emission angles correspond to angles measured from a surface normal towards light input edge 12 and the positive emission angles correspond to angles measured from a surface normal towards opposing edge 14. Since each of surfaces 20 and 40 of light guide 4 may be configured to emit light, each of such surfaces may be characterized by its own angular dependence of surface luminance which may resemble that of FIG. 14.

When measuring a localized surface luminance representing a particular area of light guide 4 or shaped illumination device 900, it is preferred that the shape and size of a sampling area approximates the shape and size of the area to be evaluated. For a spot measurement of the surface luminance, the sampling area should preferably be much smaller than the total area of the light emitting surface. Spot measurements may also be conventionally done employing a round or quasi-round sampling area. For example, for spot measuring of the surface luminance of surface 20 that has a characteristic dimension of 20 cm or more, the size of the sampling area may be from several millimeters to a couple of centimeters.

The angular dependence of surface luminance may be characterized by a peak luminance $L_p$ and an angle $\alpha_p$ corresponding to such peak luminance. According to different embodiments, the angular distribution of a spot surface luminance of light guide 4 and/or the respective light-emitting surface of shaped illumination device 900 may be bounded by specific relationships between peak emission angle $\alpha_p$ and bend angle $\beta$, e.g., in order to achieve optimal regimes of recycling light emitted from light guide 4 through secondary interactions of the emitted light with the light guide according to the principles discussed above. Such spot peak emission may be measured at an area of surface 20 relatively near light input edge 12 or at a mid-point of surface 20, for example.

According to one embodiment, $90°-\alpha_p<1.5\beta$. According to one embodiment, $90°-\alpha_p<2\beta$. According to one embodiment, $90°-\alpha_p<\beta$. According to one embodiment, $1.5(90°-\alpha_p)<\beta$. According to one embodiment, $2(90°-\alpha_p)<\beta$. In other words, the shape and curvature of light guide 4 may be selected such that at least a substantial part of light emitted in a vicinity of light input edge 12 or at a mid-point of the light emitting surface could be intercepted and recycled by an edge portion of shaped illumination device 900.

One portion of shaped illumination device 900 (e.g., one half of the light emitting area of light guide 4 adjacent to edge 14) may be configured to intercept and recycle a certain percentage of light energy emitted from another portion of the shaped illumination device 900 (e.g., the other half of the light emitting area of light guide 4 that is adjacent to edge 12). According to different embodiments, such percentage may be 20%, 30%, 50%, 60% and 75%.

The location of the light beam recapture and recycling may be at a considerable distance from the location of the initial emission. For example, light may initially be emitted from a vicinity of light input edge 12 or a mid-point of surface 20 and then intercepted and recycled in a vicinity of opposing edge 14. According to one embodiment, the distance between the location of initial emission and the location of light re-entry into light guide 4 is substantially greater than a thickness of light guide 4. For example, such distance may be at least 2 times, 5 times, 10 times, 20 times, and 50 times greater than the light guide thickness. According to some embodiments, the distance between the location of initial emission and the location of light re-entry into light guide 4 is greater than 10%, 20%, 30%, 40%, or 50% of the size of the light emitting area of surface 20 or a width of light guide 4.

Figure 15:
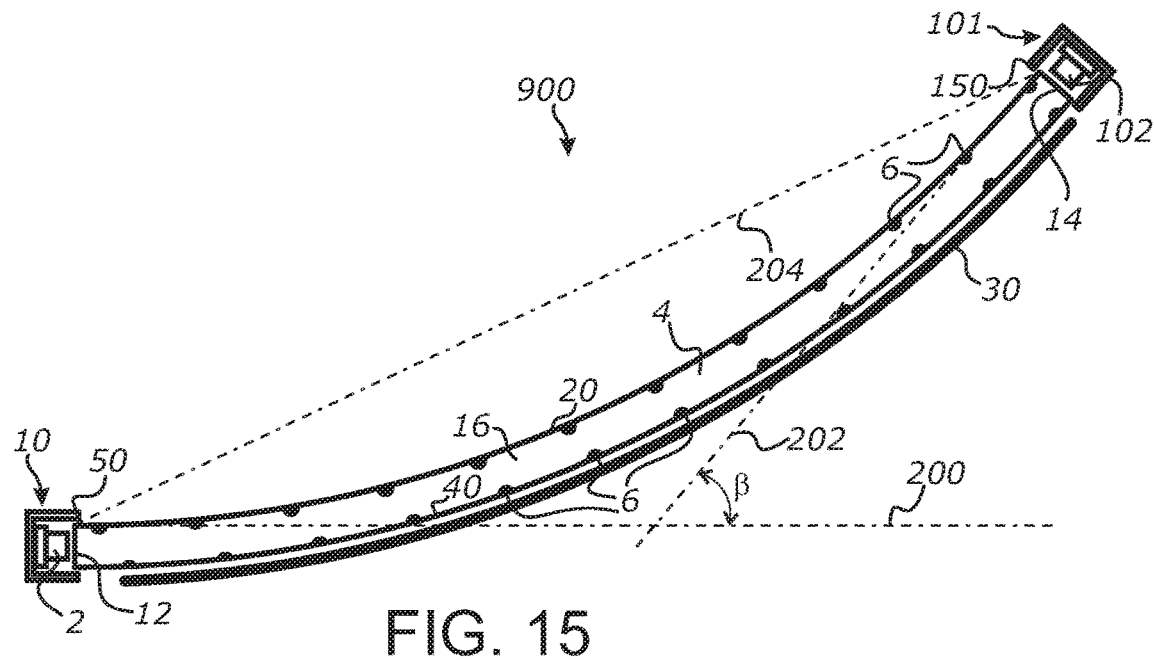
FIG. 15 is a schematic section view of a shaped light guide illumination device, showing LED sources coupled to opposing edges of a light guide, according to at least one embodiment of the present invention.

FIG. 15 schematically illustrates an embodiment of shaped illumination device 900 that includes a second linear LED source 101 that is optically coupled to opposing edge 14 of light guide 4. LED source 101 may have an identical structure to that of light source 10 and may include one or multiple LEDs 102 and opaque housing 150 encasing LED (s) 102 from three sides, as illustrated in FIG. 15. Accordingly, the structure of FIG. 15 has a symmetrical configuration in which light can travel in either direction and can be propagated, extracted and recycled symmetrically, in accordance with the principles described above for asymmetrical configurations of device 900.

Figure 17:
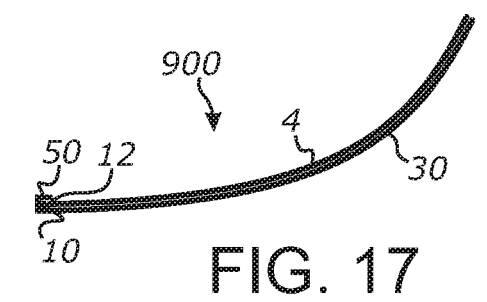
FIG. 17 is a schematic section view of a shaped light guide illumination device having a variable curvature, according to at least one embodiment of the present invention.
Figure 16:
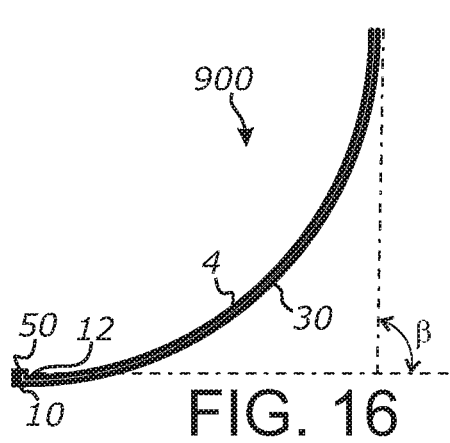
FIG. 16 is a schematic section view of a shaped light guide illumination device, showing a bend angle of about 90°, according to at least one embodiment of the present invention.
Figure 18:
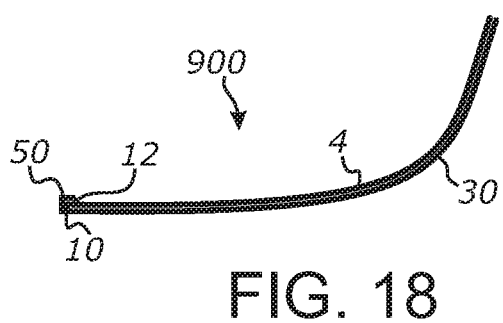
FIG. 18 is a schematic section view of a shaped light guide illumination device having a substantially planar section adjacent to a light input area, according to at least one embodiment of the present invention.

FIG. 16 schematically illustrates an embodiment of shaped illumination device 900 in which both light guide 4 and reflector 30 have a greater curvature compared to those of FIG. 2 and which is characterized by bend angle $\beta$ of about 90° (the tangent planes at opposing edges 12 and 14 being perpendicular to each other). FIG. 17 schematically illustrates an embodiment in which light guide 4 and reflector 30 have a variable curvature in a transversal cross-section that is perpendicular to light input edge 12. FIG. 18 schematically illustrates an embodiment of shaped illumination device 900 in which light guide 4 and reflector 30 both have a substantially planar section adjacent to light input edge 12.

Figure 19:
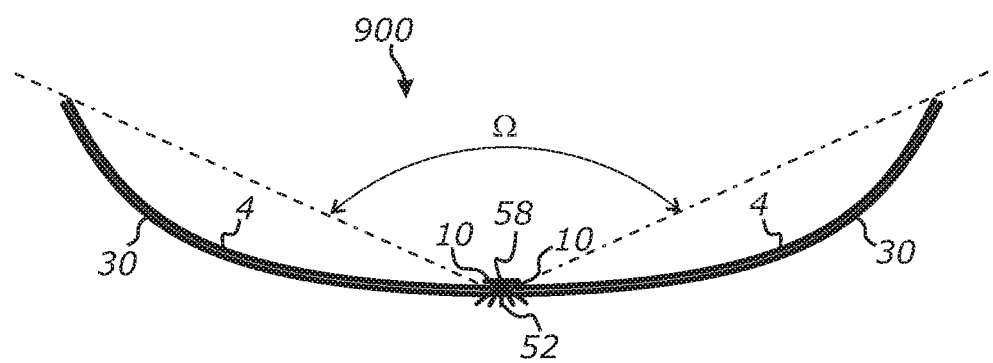
FIG. 19 is a schematic section view of a shaped light guide illumination device formed by two symmetrical sections, according to at least one embodiment of the present invention.

FIG. 19 schematically illustrates an embodiment of shaped illumination device 900 which is formed by two symmetrical sections, such as those of FIG. 17, for example. Each section is formed by its own linear light source 10, curved light guide 4 and similarly curved concave reflector 30. The resulting configuration may have the shape of a symmetrical linear trough which emits light from its concave surface. Such light-emitting trough may be configured to emit light substantially from its entire concave area (except a relatively narrow spacing area between the symmetrical sections and may be characterized by a full emission angle $\Omega$ which is less than 180°. According to different embodiments, angle $\Omega$ can be approximately 160°, 140°, 120°, 105°, and 90°. According to one embodiment, angle $\Omega$ is between 90° and 160°. According to one embodiment, angle $\Omega$ is between 105° and 140°.

According to one embodiment, light guides 4 of symmetrical device 900 of FIG. 19 may be detached from each other and separated by a spacing distance. Such distance may be selected to accommodate respective linear light sources 10 and any accompanying structural members. According to one embodiment, a single central structural support member 58 is provided. Each linear light source 10 is represented by an LED strip attached to the respective side of central structural support member 58.

Two or more linear light sources 10 may also be replaced by a single linear light source configured to emit light into opposing directions (e.g., a fluorescent tube or linear LED strip with side-emitting optics). According to one embodiment, light guides 4 may joined together at their edges and form a single sheet-form light-guiding body. Portions of light input edges 12 of the respective light guides 4 may be curved or otherwise shaped to facilitate light coupling from one or more linear light sources 10.

Shaped illumination device 900 may further include various additional light shaping layers or films. According to one embodiment, shaped illumination device 900 may include a light diffusing sheet of a transmissive type. Such light diffusing sheet may be curved to the same shape as light guide 4 and positioned adjacent to concave light output surface 20. The light diffusing sheet may also be planar or curved to a different shape than light guide 4. A transmissive light diffusing sheet may also be provided on the side of convex surface 40.

In one embodiment, shaped illumination device 900 includes a brightness enhancement film disposed on top of surface 20 of light guide 4. Such brightness enhancement film may be formed, for example, by a microprismatic film having isosceles right-angle linear microprisms distributed over its surface and facing away from light guide 4. The brightness enhancement film may be configured to trap and recycle light emerging from curved light guide 4 and result in a more collimated light output from the device.

Figure 20:
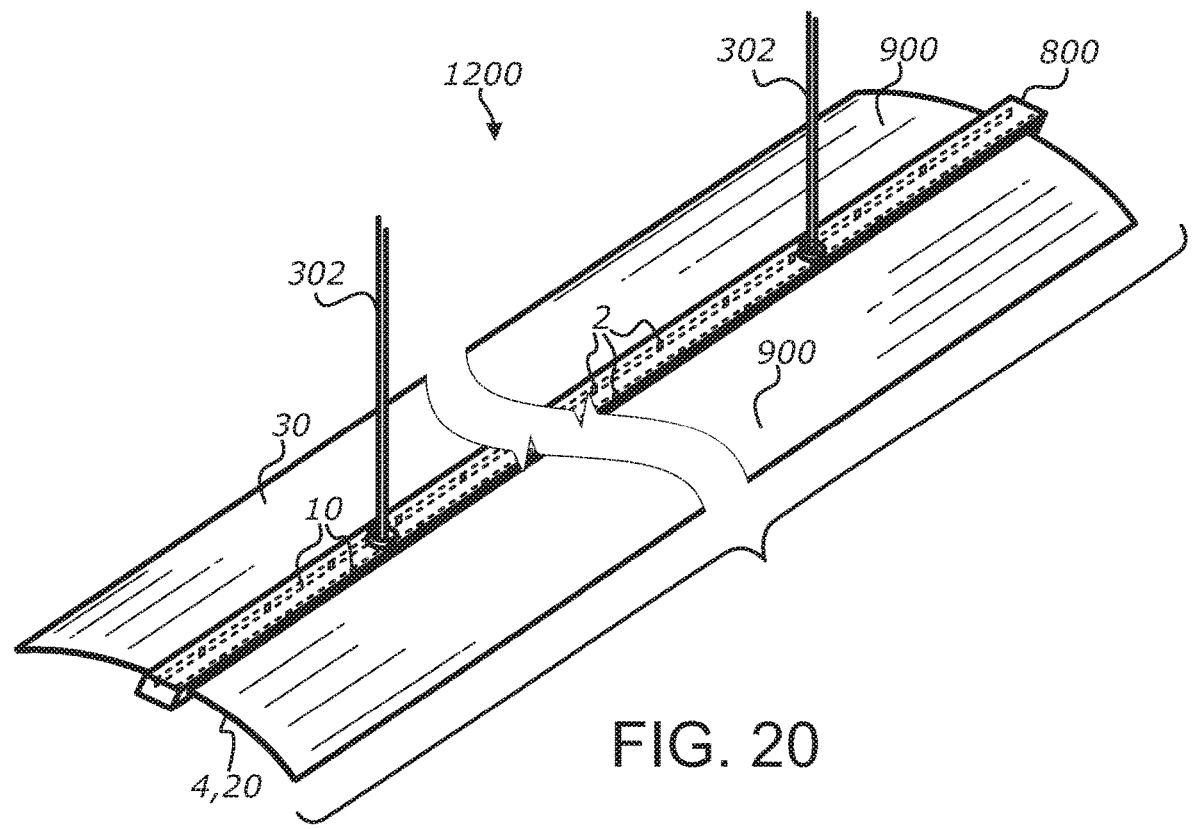
FIG. 20 is a schematic perspective view of a suspended lighting fixture employing a shaped light guide illumination device, according to at least one embodiment of the present invention.
Figure 21:
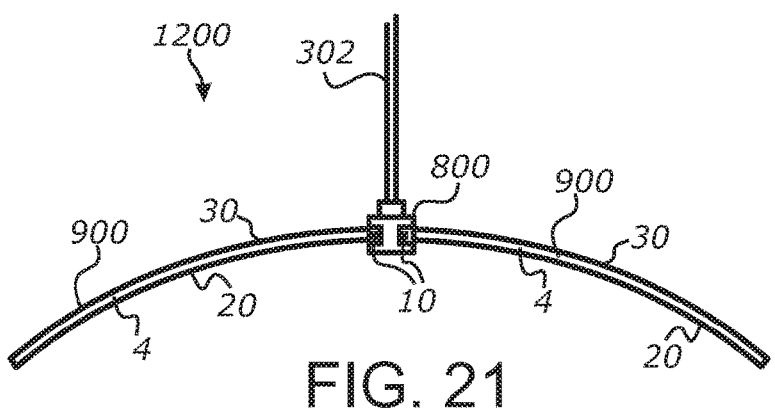
FIG. 21 is a schematic section view of a suspended lighting fixture employing a shaped light guide illumination device having two symmetrical sections, according to at least one embodiment of the present invention.
Figure 22:
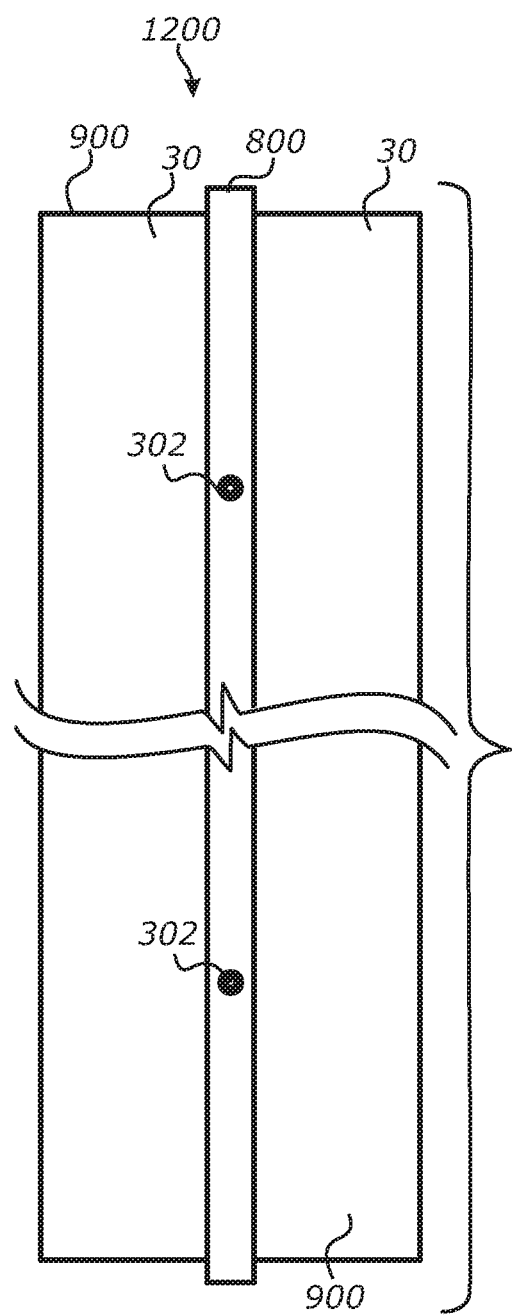
FIG. 22 is a schematic top view of a suspended lighting fixture employing a shaped light guide illumination device in a symmetric configuration, according to at least one embodiment of the present invention.
Figure 23:
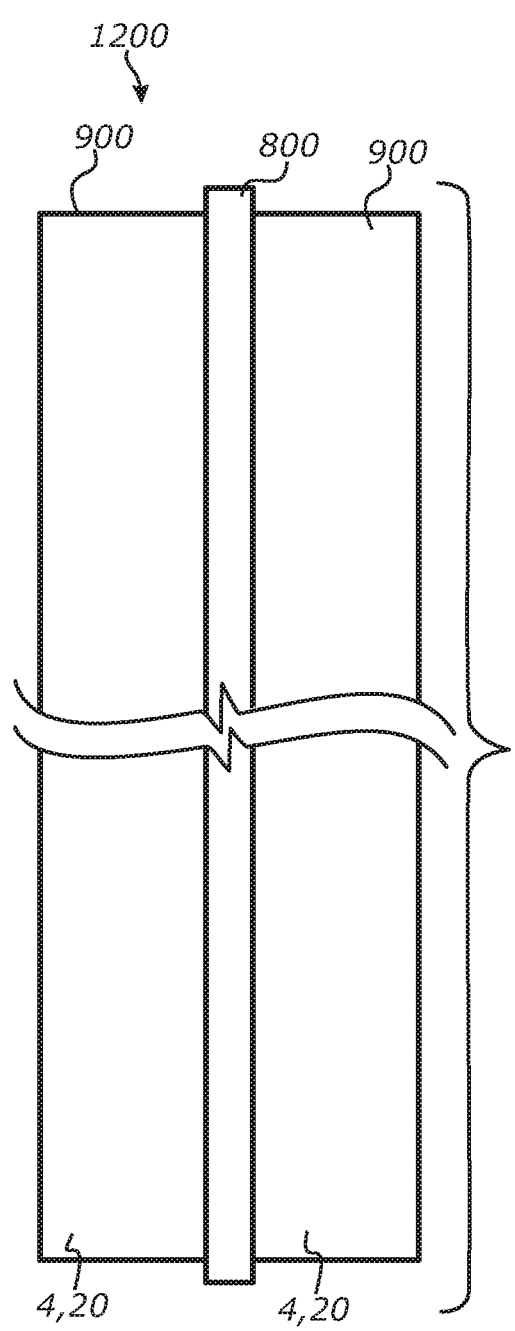
FIG. 23 is a schematic bottom view of a suspended lighting fixture employing a shaped light guide illumination device in a symmetric configuration, according to at least one embodiment of the present invention.

Either symmetrical or asymmetrical configurations of shaped illumination device 900 may be used for making various types of lighting fixtures. An exemplary embodiment of one such type of lighting fixture employing a symmetrical configuration of the device is schematically illustrated in FIG. 20, which shows a suspended downlight 1200 having an inverted trough configuration. FIG. 21, FIG. 22 and FIG. 23 schematically depict a section view, a top view and a bottom view of downlight 1200, respectively.

Downlight 1200 includes two independently operating arms (sections) of shaped illumination device 900 each having its own light guide 4, reflector 30, and linear source 10. Each of the linear light sources 10 is formed by a strip of LEDs 2 extending parallel to the respective light input edge 12. Light sources 10 and respective edges 12 of light guides 4 are enclosed into a housing 800 that is preferably opaque and may be configured to block stray light emerging from the light input areas. Light sources 10 may also be mounted to one or more rigid structural bars or profiles. By way of example, an extruded profile similar to profile 50 shown in FIG. 2. Profile 50 may also be modified to support and/or encase both of light sources 10 of downlight 1200. It may further include ribs or fins to increase its surface area and promote heat dissipation from LEDs 2.

Housing 800 may have any suitable color, such as, for example, black, white, gray, bronze, etc. A dark color, including black, may be used, for example to enhance the effect of stray light blocking. According to one embodiment, housing 800 is painted in white color or otherwise made highly reflective, e.g., by mirroring or white powder coating. Such housing 800 may be configured to assist in recycling light within the cavity formed by the trough-shaped downlight (e.g., by reflecting light exiting from edges 12 back to light guide 4) and/or mask the appearance of the housing.

Downlight 1200 further has one or more pendant suspension elements 302 used to attach the lighting fixture to an overhead structure, such as a ceiling. Each suspension element 302 may be exemplified by a pipe, which may also be configured to carry wiring within its hollow body, or one or more cables, chains, etc.

Reflector 30 may be formed from a sheet metal material. It may be bent to the prescribed curved shape and mirrored or coated with a diffuse or semi-specular light reflecting material (e.g., white paint or powder coat). Light guide 4 may be formed from a highly transmissive plastic material, such as, for example, acrylic or polycarbonate. Light guide 4 may be formed from an optically transmissive sheet that may be originally planar. Such optically transmissive sheet may be formed to the prescribed curved shape using heat, for example. Alternatively, the optically transmissive sheet may be made sufficiently thin and flexible such that it can be be elastically bent to conform to the shape of more rigid reflector 30. In a yet further alternative, either one or both reflector 30 and light guide 4 may be formed in an elastic deformation regime by applying a flexing stress and fixing a prescribed shape by stiffening ribs or other suitable means. The prescribed curved shape may also be obtained by providing a sufficiently low thickness for light guide 4 and reflector 30 such that the light guide 4 and reflector 4 could bend under their own weight (gravity-assisted bending). Such exemplary configurations of downlight 1200 may be operated while light guide 4 and/or reflector 30 are in an elastically bent, strained state.

A method of making shaped edge-lit illumination device 900 may include providing elongated light source 10 (i.e., a fluorescent tube or a strip of LEDS 2), providing light guide 4 in the form of a flexible sheet of an optically transmissive material (such as glass, PMMA, polycarbonate, or the like), providing reflector 30 in the form of a sheet of a reflective material, a step of forming light extracting features in the flexible sheet, a step of bending the flexible sheet to a predefined curved shape (e.g., at a bend angle sufficient to effectuate light recycling), a step of bending the sheet of a reflective material to the same curved shape, a step of positioning the curved reflective sheet adjacent to a convex surface of the curved light guide 4, and a step of optical coupling the elongated light source 10 to a straight edge of curved light guide 4. The method may optionally include a step of partially enclosing the elongated light source 10 into an opaque housing (e.g., such as housing 800).

According to one embodiment, downlight 1200 may include light guide 4 only and no reflector 30. In this case, downlight 1200 may be configured for direct and indirect lighting by emitting light both downwards and upwards. Such configuration may be advantageously selected, for example, when downlight 1200 is suspended below a high-reflectance ceiling. According to different embodiments, proportions between light energy emitted downwards and upwards or vice versa may be 50%/50%, 60%/40%, 70%/30%, 80%/20%, and 90%/10%.

It may be appreciated that the embodiments of downlight 1200 described above may allow for maximizing the light emitting area while maintaining a relatively low profile of the light fixture and eliminating additional components which may be unwanted in some applications. For instance, the interior of the trough-shaped body of downlight 1200 may be made substantially free from any bulky parts/components or major protrusions. In one embodiment, housing 800 protrudes into the trough cavity above surface 20 by no more than 30% of a depth of the trough, more preferably by no more than 20%, even more preferably by no more than 15%, and still even more preferably by no more than 10%. According to different embodiments, the interior of the trough-shaped body of downlight 1200 is substantially free from any objects that protrude by more than 10% of a depth of the respective trough and have a transversal size (in a plane perpendicular to a longitudinal axis of the trough) that is greater than 20%, 15%, 10%, and 5% of a width of the trough.

Figure 24:
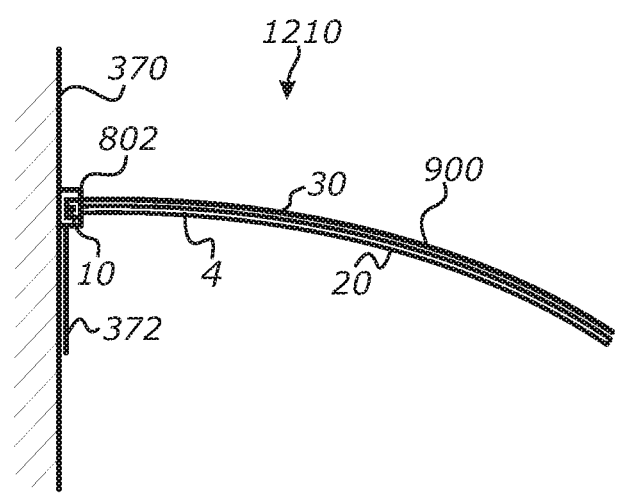
FIG. 24 is a schematic section view of a wall-mounted lighting fixture employing a shaped light guide illumination device in an asymmetric configuration, according to at least one embodiment of the present invention.

FIG. 24 schematically depicts an embodiment of a wall-mounted lighting fixture 1210 employing shaped illumination device 900 in an asymmetric configuration. Lighting fixture 1210 is mounted to a wall 370 and is configured to emit a soft, divergent light beam from the entire concave broad-area surface (surface 20) while limiting the angular spread of the emitted light to only functional directions (e.g., downward only and/or generally away from wall 24) and hiding the light source from the direct view. Lighting fixture 1210 may optionally include a wall reflector 372 configured to receive and reflect stray light emitted towards wall 370.

Further details of a structure and different modes of operation of shaped edge-lit illumination devices shown in the drawing figures as well as their possible variations and uses will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more."

Any numerical range recited herein is intended to include all sub-ranges subsumed therein. For example, a range of 1 to 10 is intended to include all sub-ranges between and including the recited minimum value of 1 and the recited maximum value of 10, that is, having a minimum value equal to or greater than 1 and a maximum value of equal to or less than 10, such as, for example, 3 to 6 or 2.5 to 8.5. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a). Also, unless otherwise indicated, all numerical parameters are to be understood as being prefaced and modified in all instances by the term "about", in which the numerical parameters possess the inherent variability characteristic of the underlying measurement techniques used to determine the numerical value of the parameter.

All structural, chemical, and functional equivalents to the elements of the above-described preferred embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Any incorporation by reference of documents above is limited such that no subject matter is incorporated that is contrary to the explicit disclosure herein. It is noted that, where a definition or use of a term in a reference, which is incorporated by reference herein is inconsistent or contrary to the definition of that term provided herein, the definition of that term provided herein applies and the definition of that term in the reference does not apply. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A suspended lighting fixture for direct/indirect lighting, comprising:
    a thin curved sheet of an optically transmissive material having a concave broad-area surface, an opposing convex broad-area surface extending parallel to the concave broad-area surface, a first edge, and an opposing second edge;
    an elongated heat dissipating structural element longitudinally extending along the first edge;
    a plurality of interconnected LED sources arranged into an LED strip and optically coupled to the first edge, wherein the LED strip is attached to the structural element;
    an opaque elongated housing at least partially enclosing the LED strip;
    a plurality of forward-deflecting or forward-scattering light extraction elements formed in or on at least one of the concave and convex broad-area surfaces and distributed over an area of the curved sheet according to a two-dimensional pattern; and
    one or more suspension elements configured for suspending the lighting fixture with a downward orientation of the concave broad-area surface;
    wherein at least some of the plurality of forward-deflecting or forward-scattering light extraction elements are configured to extract light from the curved sheet and distribute the extracted light from both the concave and convex broad-area surfaces.

2. A suspended lighting fixture as recited in claim 1, wherein a first portion of the curved sheet is disposed in energy receiving relationship with a second portion of the curved sheet and configured to receive light on a concave surface and transmit the received light to exit from an opposing convex surface.

3. A suspended lighting fixture as recited in claim 1, wherein a concave surface portion of the curved sheet disposed near the first edge is configured to emit at least some light towards the second edge.

4. A suspended lighting fixture as recited in claim 1, wherein a surface portion of the curved sheet disposed near the first edge is configured at an angle of peak luminance of greater than 60°.

5. A suspended lighting fixture as recited in claim 1, comprising a second plurality of interconnected LED sources arranged into a second LED strip, a second elongated heat dissipating structural element, and a second opaque elongated housing at least partially enclosing the second LED strip, wherein the second plurality of interconnected LED sources is attached to the second elongated heat dissipating structural element and optically coupled to the second edge.

6. A suspended lighting fixture as recited in claim 1, wherein at least one of the suspension elements comprises one or more cables or chains, wherein at least one of said light extraction elements defines a surface structure having a total volume between 1000 cubic micrometers and 500000 cubic micrometers, a size between 20 to 200 micrometers, and an irregular shape.

7. A suspended lighting fixture as recited in claim 1, wherein at least one of the suspension elements comprises a pipe configured to carry wiring within a hollow body.

8. A suspended lighting fixture as recited in claim 1, wherein at least some of the plurality of forward-deflecting or forward-scattering light extraction elements are formed by discrete surface relief features separated from each other by smooth portions of the concave or convex broad-area surfaces.

9. A suspended lighting fixture as recited in claim 1, wherein in at least one of the light extraction elements is configured to extract light from the concave broad-area surface at a first location of the curved sheet and direct at least a portion of the extracted light toward a second location of the curved sheet that is distant from said first location, wherein the curved sheet is configured to receive the extracted light on the concave broad-area surface at the second location and propagate the received light to exit from the convex broad-area surface.

10. A suspended lighting fixture as recited in claim 1, wherein the curved sheet is configured at a bend angle greater than 45° and less than 90°.

11. A suspended lighting fixture as recited in claim 1, wherein the curved sheet is configured at a bend angle greater than 30° and less than 90°.

12. A suspended lighting fixture as recited in claim 1, wherein the curved sheet is configured at a bend angle greater than 90° and less than 180°.

13. A suspended lighting fixture as recited in claim 1, wherein at least a portion of the concave broad-area surface of the curved sheet is configured at an off-axis surface luminance that is greater than an on-axis surface luminance at least by a factor of 1.2.

14. A suspended lighting fixture as recited in claim 1, wherein the curved sheet is configured to distribute 40% of light upward and 60% of the light downward.

15. A suspended lighting fixture as recited in claim 1, wherein the curved sheet is configured to distribute light upward and downward in approximately equal proportions.

16. A suspended lighting fixture as recited in claim 1, wherein the curved sheet is configured to distribute light upward and downward in unequal proportions.

17. A suspended lighting fixture as recited in claim 1, comprising a diffuse reflector conformably covering at least a portion of the convex broad-area surface.

18. A suspended lighting fixture for direct/indirect lighting, comprising:
a first curved sheet of an optically transmissive material having a first light input edge;
a second curved sheet of an optically transmissive material being symmetrically disposed with respect to the first curved sheet to cooperatively form a trough-shaped structure and having a second light input edge facing the first light input edge;
an elongated heat dissipating structural element positioned between the first and second curved sheets;
a first strip of LEDs attached to a first longitudinal side of the structural element and optically coupled to the first light input edge;
a second strip of LEDs attached to an opposing second longitudinal side of the structural element and optically coupled to the second light input edge;
an opaque elongated housing at least partially enclosing the first and second strips of LEDs;
a first plurality of light extraction elements formed in or on a first surface of the first curved sheet and distributed over the first surface according to a first two-dimensional pattern;
a second plurality of light extraction elements formed in or on a second surface of the second curved sheet and distributed over the second surface according to a second two-dimensional pattern; and
one or more suspension elements configured to retain the trough-shaped structure in a downward orientation;
wherein at least some of the first plurality of light extraction elements are configured to distribute light from two opposing broad-area surfaces of the first curved sheet, wherein at least some of the second plurality of light extraction elements are configured to distribute light from two opposing broad-area surfaces of the second curved sheet, and wherein the trough-shaped structure is configured to distribute a smaller portion of total emitted light upward and a larger portion of the total emitted light downward.

19. A suspended lighting fixture as recited in claim 18, wherein at least one of the light extraction elements is formed by one or more discrete forward-deflecting or forward-scattering surface relief features and wherein at least a portion of the a light emitting surface of the first curved sheet is configured at an off-axis surface luminance that is greater than an on-axis surface luminance at least by a factor of 1.2.

20. A suspended lighting fixture for direct/indirect lighting, comprising:
a first curved sheet of an optically transmissive material having a first light input edge;
a second curved sheet of an optically transmissive material being symmetrically disposed with respect to the first curved sheet to cooperatively form a trough-shaped structure and having a second light input edge disposed parallel to the first light input edge;
an elongated heat dissipating structural element joining the first and second curved sheets;
a first strip of LEDs attached to the structural element and optically coupled to the first light input edge;
a second strip of LEDs attached to the structural element and optically coupled to the second light input edge;
an opaque elongated housing at least partially enclosing the first and second strips of LEDs;
a first plurality of light extraction elements formed in or on a first surface of the first curved sheet and distributed over the first surface according to a first two-dimensional pattern;
a second plurality of light extraction elements formed in or on a second surface of the second curved sheet and distributed over the second surface according to a second two-dimensional pattern; and
one or more suspension elements configured to suspend the lighting fixture with a downward orientation of the trough-shaped structure;
wherein at least some of the first plurality of light extraction elements are configured to extract light from two opposing broad-area surfaces of the first curved sheet, wherein at least some of the second plurality of light extraction elements are configured to extract light from two opposing broad-area surfaces of the second curved sheet, and wherein the lighting fixture is configured to distribute a smaller portion of light upward and a larger portion of the light downward.

21. A suspended lighting fixture as recited in claim 20, wherein the trough-shaped structure is configured to distribute 40% of light upward and 60% of the light downward.

22. A suspended lighting fixture as recited in claim 20, comprising a first reflector covering a surface of the first curved sheet and a second reflector covering a surface of the second curved sheet.

23. A suspended lighting fixture as recited in claim 20, wherein both the first and second curved sheets are configured to emit light at an off-axis surface luminance which is greater than an on-axis surface luminance at least by a factor of 1.2.

24. A suspended lighting fixture as recited in claim 20, wherein each of the first and second curved sheets is configured to distribute light upward and downward in approximately equal proportions.

25. A suspended lighting fixture as recited in claim 20, wherein at least one of the light extraction elements comprises a surface relief feature formed by a forward-scattering material, and wherein a surface density of the light extraction elements increases with a distance to elongated heat dissipating structural element.

26. A suspended lighting fixture as recited in claim 20, wherein the first curved sheet is configured to emit light from an edge which is opposite to the first light input edge and wherein the second curved sheet is configured to emit light from an edge which is opposite to the second light input edge.

\* \* \* \* \*